US010050689B2

(12) United States Patent
Kim et al.

(10) Patent No.: US 10,050,689 B2
(45) Date of Patent: Aug. 14, 2018

(54) METHOD OF DETERMINING A WEIGHT OF A DIGITAL BEAMFORMING IN A WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 15/302,466

(22) PCT Filed: Feb. 17, 2015

(86) PCT No.: PCT/KR2015/001617
§ 371 (c)(1),
(2) Date: Oct. 6, 2016

(87) PCT Pub. No.: WO2015/156496
PCT Pub. Date: Oct. 15, 2015

(65) Prior Publication Data
US 2017/0033852 A1 Feb. 2, 2017

Related U.S. Application Data

(60) Provisional application No. 61/975,886, filed on Apr. 6, 2014.

(51) Int. Cl.
*H04B 7/06* (2006.01)
*H04B 7/0456* (2017.01)

(52) U.S. Cl.
CPC ......... *H04B 7/0617* (2013.01); *H04B 7/0456* (2013.01); *H04B 7/0639* (2013.01); *H04B 7/0619* (2013.01)

(58) Field of Classification Search
CPC ... H04B 7/0617; H04B 7/0456; H04B 7/0639
(Continued)

(56) References Cited

U.S. PATENT DOCUMENTS

2012/0033761 A1  2/2012 Guo et al.
2013/0039445 A1  2/2013 Hwang
(Continued)

FOREIGN PATENT DOCUMENTS

KR  20130127376  11/2013

OTHER PUBLICATIONS

PCT International Application No. PCT/KR2015/001617, Written Opinion of the International Searching Authority dated May 28, 2015, 9 pages.

*Primary Examiner* — Kevin M Burd
(74) *Attorney, Agent, or Firm* — Lee, Hong, Degerman, Kang & Waimey

(57) ABSTRACT

A method of determining a weight for a beamforming by a base station in a wireless communication system according to one embodiment of the present invention may include determining an angle of an analog beamforming in a hybrid beamforming in which the analog beamforming and a digital beamforming are coupled, obtaining a pre-compensation component with respect to the analog beamforming to be applied to the digital beamforming based on the angle of the analog beamforming, and determining the weight of the digital beamforming using the obtained pre-compensation component with respect to the analog beamforming and an angle determination component of the digital beamforming.

9 Claims, 10 Drawing Sheets

(58) Field of Classification Search
USPC .......................................................... 375/267
See application file for complete search history.

(56) References Cited

U.S. PATENT DOCUMENTS

| | | |
|---|---|---|
| 2013/0202054 A1 | 8/2013 | Khan et al. |
| 2014/0050280 A1 | 2/2014 | Stirling-Gallacher et al. |
| 2014/0355707 A1* | 12/2014 | Kim ..................... H04B 7/0469 |
| | | 375/267 |
| 2016/0353294 A1* | 12/2016 | Wang ................... H04B 7/0456 |

* cited by examiner

METHOD OF DETERMINING A WEIGHT OF A DIGITAL BEAMFORMING IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/001617, filed on Feb. 17, 2015, which claims the benefit of U.S. Provisional Application No. 61/975,886, filed on Apr. 6, 2014, the contents of which are all hereby incorporated by reference herein in their entirety.

TECHNICAL FIELD

The present invention relates to a method of determining a weight of a digital beamforming for performing a hybrid beamforming in a wireless communication system and apparatus therefor.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

TECHNICAL TASK

The technical task of the present invention is to provide a method of accurately and efficiently determining a weight of a digital beamforming for performing a hybrid beamforming in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, a method of determining a weight for a beamforming by a base station in a wireless communication system according to one embodiment of the present invention may include determining an angle of an analog beamforming in a hybrid beamforming in which the analog beamforming and a digital beamforming are coupled, obtaining a pre-compensation component with respect to the analog beamforming to be applied to the digital beamforming based on the angle of the analog beamforming, and determining the weight of the digital beamforming using the obtained pre-compensation component with respect to the analog beamforming and an angle determination component of the digital beamforming.

Preferably, the pre-compensation component with respect to the analog beamforming may include a coefficient for eliminating a digital beam steering to be caused by the analog beamforming from the digital beamforming.

Preferably, the obtaining the pre-compensation component with respect to the analog beamforming may include the obtaining the pre-compensation component with respect to the analog beamforming based on the number ($N_{RF}$) of RF chains for performing the analog beamforming, the number ($N_t^{RF}$) of analog antennas included in each of the RF chains, and the angle ($\Phi$) of the analog beamforming. More preferably, the obtaining the pre-compensation component with respect to the analog beamforming may include the obtaining a vector including total $N_t^{RF}$ coefficients, wherein an $i^{th}$ coefficient of the vector corresponds to $e^{j\pi \cdot N_t^{RF} \cdot (i-1) \cdot sin(\Phi)}$.

Preferably, the obtaining the pre-compensation component with respect to the analog beamforming may include the performing Hadamard Product of the pre-compensation component with respect to the analog beamforming and the angle determination component of the digital beamforming.

Preferably, the method may further include the obtaining the angle determination component of the digital beamforming using the number ($N_{RF}$) of RF chains for performing the analog beamforming, the number ($N_t^{RF}$) of analog antennas included in each of the RF chains, and a setup angle ($\beta$) of the digital beamforming. More preferably, the angle determination component of the digital beamforming may include a vector including total $N_t^{RF}$ coefficients and an $i^{th}$ coefficient of the vector may correspond to $e^{-j\pi \cdot N_t^{RF} \cdot (i-1) \cdot sin(\beta)}$.

To further achieve these and other advantages and in accordance with the purpose of the present invention, as embodied and broadly described, a method of determining a Precoding matrix index (PMI) for a beamforming by a base station in a wireless communication system according to another embodiment of the present invention may include determining an angle of the a second type beamforming in a hybrid beamforming and an angle of the hybrid beamforming in which a first type beamforming and the second type beamforming are hierarchically performed and selecting a PMI for the first type beamforming from a codebook based on the determined angle of the second type beamforming and the determined angle of the hybrid beamforming, wherein the PMI selected from the codebook pre-compensates the first type beamforming for a steering by the second type beamforming.

Preferably, the PMI may correspond to Hadamard Product of a first vector in size of $N_t^{RF}$ and a second vector in the size of the $N_t^{RF}$, an $i^{th}$ coefficient of the first vector corresponds to $e^{j\pi \cdot N_t^{RF} \cdot (i-1) \cdot sin(\Phi)}$, an $i^{th}$ coefficient of the second vector may correspond to $e^{-j\pi \cdot N_t^{RF} \cdot (i-1) \cdot sin(\beta)}$, the $N_{RF}$ may include the number of RF chains for performing the second type beamforming, the $N_t^{RF}$ may include the number of antennas included in each of the RF chains, the $\beta$ may include the angle of the hybrid beamforming, and the Φ may include the angle Φ of the second type beamforming.

More preferably, if the number of the RF chains for performing the second type beamforming and the number of the antennas included in each of the RF chains are 4 and 4, respectively, the codebook may include Table 2 in the present specification.

More preferably, n the first type beamforming may include the digital beamforming and the second type beamforming may include the analog beamforming.

To further achieve these and other advantages and in accordance with the purpose of the present invention, as embodied and broadly described, in determining a weight for a beamforming in a wireless communication system, a base station according to further embodiment of the present invention may include a transmitter transmitting a downlink signal to a user equipment, a receiver receiving an uplink signal from the user equipment, and a processor controlling the transmitter and the receiver, the processor determining an angle of an analog beamforming in a hybrid beamforming in which the analog beamforming and a digital beamforming are coupled, the processor obtaining a pre-compensation component with respect to the analog beamforming to be applied to the digital beamforming based on the angle of the analog beamforming, the processor determining the weight of the digital beamforming using the obtained pre-compensation component with respect to the analog beamforming and an angle determination component of the digital beamforming.

To further achieve these and other advantages and in accordance with the purpose of the present invention, as embodied and broadly described, in determining a Precoding matrix index (PMI) for a beamforming in a wireless communication system, a base station according to another further embodiment of the present invention may include a transmitter transmitting a downlink signal to a user equipment, a receiver receiving an uplink signal from the user equipment, and a processor determining an angle of the a second type beamforming in a hybrid beamforming and an angle of the hybrid beamforming in which a first type beamforming and the second type beamforming are hierarchically performed, the processor selecting a PMI for the first type beamforming from a codebook based on the determined angle of the second type beamforming and the determined angle of the hybrid beamforming, wherein the PMI selected from the codebook pre-compensates the first type beamforming for a steering by the second type beamforming.

Advantageous Effects

According to an embodiment of the present invention, by pre-compensating for an error of a digital beamforming caused by an analog beamforming in a hybrid beamforming having the digital beamforming and the analog beamforming combined therein, a weight of the digital beamforming can be accurately determined and a hybrid beam can be controlled accurately and efficiently.

Effects obtainable from the present invention may be non-limited by the above mentioned effect. And, other unmentioned effects can be clearly understood from the following description by those having ordinary skill in the technical field to which the present invention pertains.

MODE FOR INVENTION

Reference will now be made in detail to the preferred embodiments of the present invention, examples of which are illustrated in the accompanying drawings. Configurations, functions and other features of the present invention can be easily understood through the embodiments of the present invention.

In the present specification, a name of a base station can be used as an inclusive terminology for RRH (remote control head), eNB, TP (transmission point), RP (repetition point), RN (relay) or the like. Moreover, in case of applying carrier aggregation, an operation of a base station described by the invention may be applicable to a component carrier (CC) or a cell. A beamforming covers the precoding concept and a weight vector/matrix for a beamforming covers the concept of a precoding vector/matrix.

MIMO Environment

Figure 1:
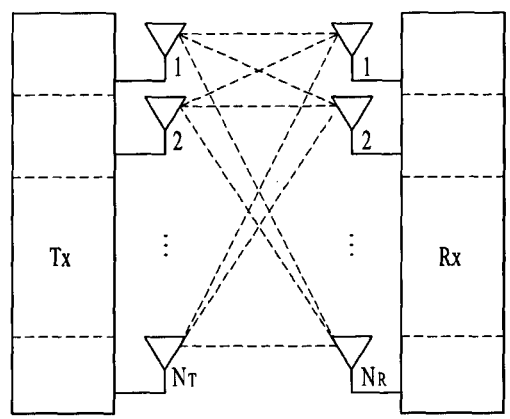
FIG. 1 is a diagram of a general MIMO environment.

A general MIMO (multi-input multi-output) environment is described with reference to FIG. 1 as follows.

$N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \qquad \text{[Formula 2]}$$

Meanwhile, transmission powers can be set different from each other for transmission informations $s_1, s_2, \ldots s_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, $\hat{S}$ may be represented as Formula 4 using a diagonal matrix P of the transmission power.

$$\hat{s} = \begin{bmatrix} P_1 & & 0 \\ & P_2 & \\ & & \ddots \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Formula 5]}$$

$$W\hat{s} = WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \le \min(N_T, N_R) \qquad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \le \text{rank}(H) \le \min(N_T, N_R) \qquad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

The maximum number of transceiving antennas is assumed as 8 in a general MIMO environment. Yet, as the MIMO environment is evolved into a massive MIMO, the number of antennas can increase over tens or hundreds.

Figure 2:
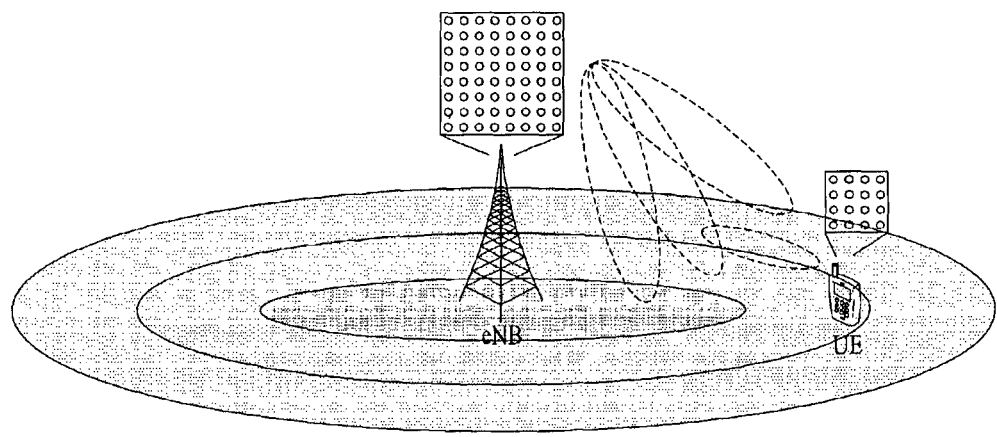
FIG. 2 is a diagram of a massive MIMO environment.

FIG. 2 shows one embodiment of a massive MIMO environment. Particularly, FIG. 2 diagrammatizes a system in which a base station or user equipment has a plurality of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of antennas. In doing so, it is advantageous in that the user equipment can set its transmission power to a very low power in consideration of a gain of the massive receiving antennas in order to reduce interference influence.

Analog Beamforming & Digital Beamforming

Figure 3:
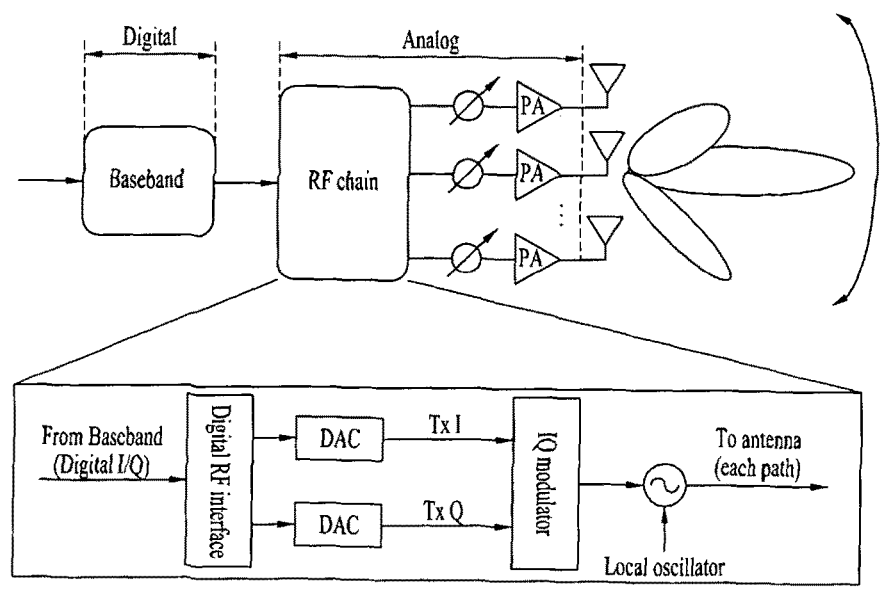
FIG. 3 is a diagram for one example of an analog beamforming scheme.

FIG. 3 is a diagram for one example of an analog beamforming scheme. An analog beamforming scheme is a representative beamforming scheme applied to an initial multi-antenna structure. A beamforming is performed in a manner as follows. First of all, after a digital signal processing has been completed, an analog signal is made to diverge into a plurality of paths. Secondly, phase shift (PS) and power amplification (power amplifier: PA) are set up on each of the diverging paths.

Referring to FIG. 3, an analog beamforming is performed in a manner that a power amplifier and a phase shifter connected to an antenna process an analog signal outputted from a single digital signal. In an analog stage, the phase shifter and the power amplifier applies a complex weight to the analog signal. In FIG. 1, an RF (radio frequency) chain means a processing block for converting a signal digital signal to an analog signal.

Yet, according to an analog beamforming scheme, accuracy of a beam is determined depending on characteristics of devices of the phase shifter and the power amplifier. Hence, in aspect of controlling the devices of the phase shifter and the power amplifier, the analog beamforming scheme is appropriate for a narrowband transmission. According to the analog beamforming scheme, since complexity of a hardware structure increases considerably in case of implementing a multi-stream transmission, it is difficult to improve a transmission rate through a multiplexing gain and it is also difficult to perform a beamforming per user based on orthogonal resource allocation.

Figure 4:
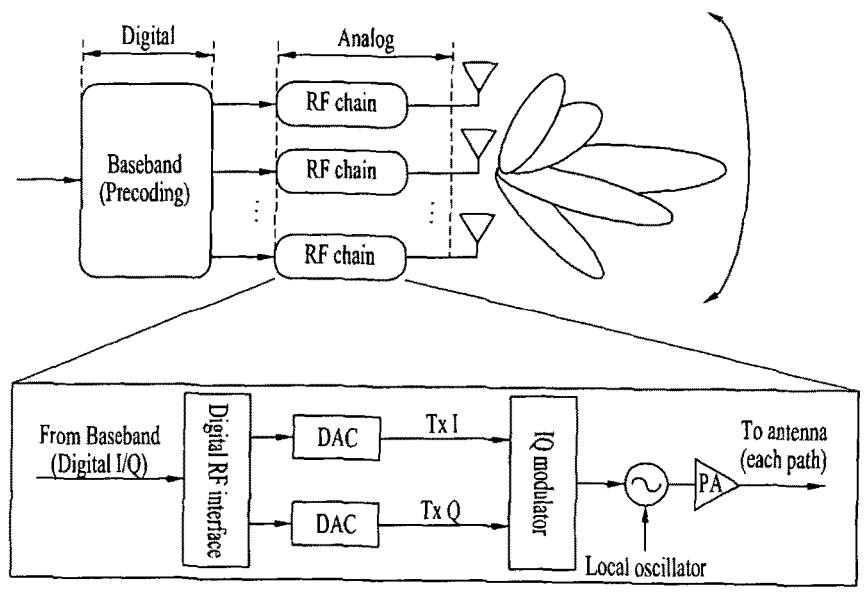
FIG. 4 is a diagram for one example of a digital beamforming scheme.

FIG. 4 is a diagram for one example of a digital beamforming scheme. According to the digital beamforming scheme, a beamforming is performed in a digital stage using a baseband process. Hence, unlike the analog beamforming scheme, the digital beamforming scheme is appropriate for maximizing diversity and multiplexing gain in an MIMO environment.

Referring to FIG. 4, application of a weight matrix (or a precoding matrix), e.g., a precoding is performed in a baseband process. In case of a digital beamforming, unlike the case of the analog beamforming shown in FIG. 1, an RF chain includes a power amplifier. The reason for this is that a complex weight for a beamforming is directly applied to a transmitted data.

Moreover, according to a digital beamforming scheme, it is able to form a beam different for each user. For instance, beams for multiple users can be simultaneously formed. Since it is possible to implement a digital beamforming independent for each user to which an orthogonal resource is allocated, a scheduling is relatively free and an operation of a transmitting stage in accordance with a system purpose is facilitated. Moreover, if MIMO-OFDM (orthogonal frequency division multiplexing) and technology are applied in a broadband transmission environment, it is able to form a beam independent per subcarrier. Thus, according to the digital beamforming scheme, since system capacity and beam gain are improved, a transmission rate for each user can be maximized.

In order to apply a digital beamforming technology in a massive MIMO environment, since a baseband processor should perform a precoding process for hundreds of antennas, digital signal processing complexity increases considerably. Moreover, since RF chains are required as many as the number of antennas, hardware implementation complexity increases considerably. Particularly, in case of FDD (frequency division duplex) system, since feedback information on massive MIMO channels for the entire antennas is required, it is disadvantageous in that a reference signal (or pilot signal) transmission and feedback overhead for the corresponding transmission are increased considerably.

If an analog beamforming technology is applied in a massive MIMO environment, hardware complexity of a transmitting stage is relatively low, an performance increase extent using multiple antennas is insignificant, and flexibility of resource allocation is lowered. Particular, in case of a broadband transmission, it is very difficult to control a beam per frequency.

Table 1 shows performance gain and complexity relations between an analog beamforming scheme and a digital beamforming scheme.

TABLE 1

| | Beamforming accuracy control facilitation | Multi-carrier beam control | Multi-stream transmission | Hardware complexity (BB process) | Pilot and feedback overhead |
| --- | --- | --- | --- | --- | --- |
| Analog beamforming scheme | Low (PA/PS device characteristics and relation) | Impossible or difficult | Impossible or difficult | Low | Low |
| Digital beamforming scheme | High | Possible | Possible | High | High |

Modeling of Hybrid Beamforming

In a massive MIMO environment according to one embodiment of the present invention, instead of selectively applying one of an analog beamforming scheme and a digital beamforming scheme, it is able to apply a hybrid beamforming resulting from combining an analog beamforming structure and a digital beamforming structure together. Therefore, in order to lower hardware implementation complexity of a transmitting stage and to obtain a maximum beamforming gain using a massive MIMO, it is necessary to design a transmitting stage structure of a hybrid type.

Figure 5:
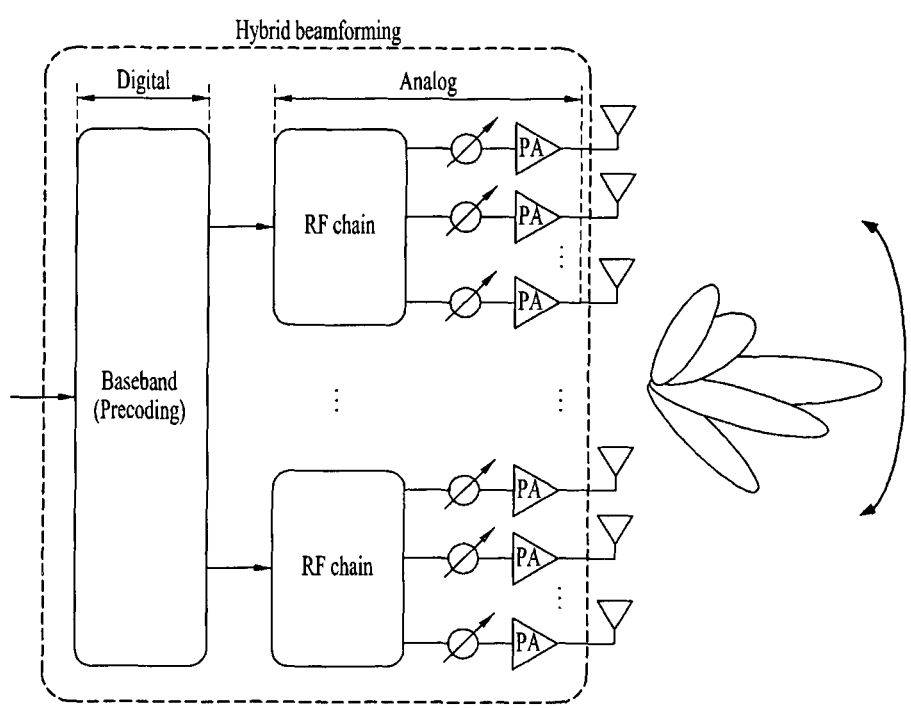
FIG. 5 is a diagram to describe the concept of a hybrid beamforming according to one embodiment of the present invention.

FIG. 5 is a diagram to describe the concept of a hybrid beamforming according to one embodiment of the present invention. According to a hybrid beamforming, a digital signal of a baseband having a digital beamforming scheme applied thereto is primarily converted to an analog signal of an RF band and an analog beamforming scheme is secondarily applied to the analog signal. Hence, for a hybrid beamforming scheme, a transmitting stage should be able to support both of the digital beamforming scheme and the analog beamforming scheme.

Items or matters taken into consideration for a hybrid beamforming are described as follows.

It is difficult to simultaneously optimize an analog beamforming and a digital beamforming. Basically, a digital beamforming is able to apply a beamforming scheme independent per user with the same time-frequency resource. On the other hand, an analog beamforming has a limitation such that a beamforming scheme common to users should be applied with the same time-frequency resource. The limitation of the analog beamforming causes difficulty in optimizing the supportable rank number, beam control flexibility and beamforming resolution in a hybrid beamforming.

An analog beamforming scheme for forming a beam in a specific direction only in the same time-frequency resource has difficulty in forming a plurality of beams in all user equipment direction at the same time. Hence, the analog beamforming scheme causes a problem that UL/DL control channel, reference signal, synchronization signal and the like are not transmitted simultaneously to all user equipments distributed in all areas in a cell.

In case of performing channel estimation on an analog/digital beam, a digital beamforming scheme can use an existing orthogonal pilot assignment as it is. Yet, in an analog beamforming scheme, a time-duration amounting to the number of beam candidates is required. A time delay taken for a channel estimation of an analog beam is relatively long. In case of estimating a digital beam and an analog beam simultaneously, complexity increases considerably.

According to a digital beamforming scheme, a beamforming for multiple users/streams is free. Yet, according to an analog beamforming scheme, since a beamforming by the same weight vector/matrix is performed on a full transmission band, it is difficult to perform a beamforming independent per user or stream. Particularly, since FDMA (e.g., OFDMA) support through orthogonal frequency resource allocation is difficult, it is difficult to optimize a frequency resource.

In the following description, feedback methods for a hybrid beamforming are explained in consideration of the features or properties mentioned in the foregoing description. First of all, in an existing mobile communication system that uses one of an analog beamforming scheme and a digital beamforming scheme, performing a closed loop based beamforming (or precoding) is facilitated. For instance, a user equipment receives a reference signal transmitted by a base station and then determines a precoding matrix index (PMI), a rank indicator (RI), and a channel quality indicator (CQI). The user equipment feeds back a channel state information (CSI) containing the PMI, CQI and/or RI to the base station. Subsequently, the base station performs a beamforming using the PMI transmitted by the user equipment. Alternatively, the base station may perform a beamforming using a different PMI without being restricted by the PMI transmitted by the user equipment.

Thus, in case that the existing method is intactly applied to a hybrid beamforming, a user equipment should measure and report a PMI for an analog beamforming and a PMI for a digital beamforming, respectively. Hence, overhead for the measurement and reporting increases twice. Moreover, if the PMI for the analog beamforming and the beamforming for the digital beamforming are different from each other, it causes another problem. For instance, assuming that an optimal PMI for an analog beamforming and an optimal PMI for a digital beamforming indicate a zero-degree direction and a 30-degree direction, respectively, since a direction of an analog beam and a direction of a digital beam are different from each other, a gain of a hybrid beamforming may be represented as low considerably.

According to one embodiment of the present invention, it is able to determine a PMI for a digital beamforming based on a measurement of an analog beam. For instance, a user equipment feeds back only a measurement result of an analog beam to a base station and may not feed back a PMI for a digital beamforming. For another instance, a user equipment may determine a PMI for a digital beamforming using a measurement result of an analog beam. A measurement result of the analog beam and the PMI for the digital beamforming may be fed back to a base station.

Figure 6:
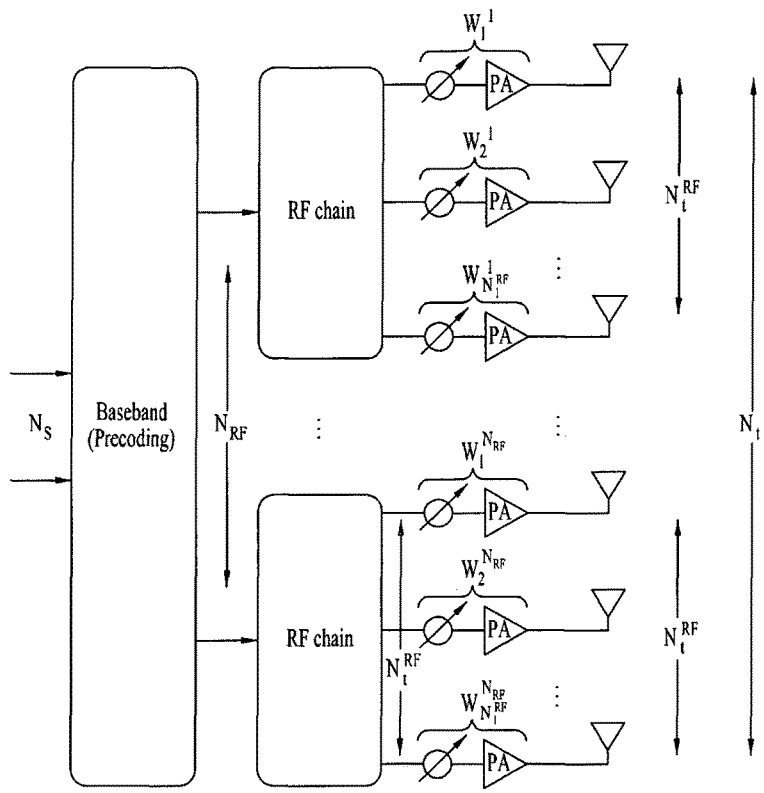
FIG. 6 is a diagram of a structure of a transmitting stage for performing a hybrid beamforming according to one embodiment of the present invention.

FIG. 6 is a diagram of a structure of a transmitting stage for performing a hybrid beamforming according to one embodiment of the present invention. According to the present embodiment, each RF chain is assumed as including $N_t^{RF}$ independent antennas, by which the present embodiment is non-limited. For instance, the number of antennas provided to each RF chain may be configured differently.

According to the present embodiment, a relation of $N_t = N_t^{RF} \times N_{RF}$ exists among the total antenna number $N_t$, the RF chain number $N_{RF}$ and the per-RF chain antenna number $N_t^{RF}$. Since a signal having passed through a phase shifter and a power amplifier per RF chain is sent to a transmitting antenna, a system model can be defined as Formula 8.

$$y_k = H_k F_k^{RF} F_k^{BB} s_k + z_k \qquad \text{[Formula 8]}$$

In Formula 8, the k indicates a subcarrier index. The subcarrier index k has a value ranging 0 to $(N_{FFT}-1)$. The $N_{FFT}$ indicates a maximum FFT (Fast Fourier Transform) size supported by a system. And, the total subcarrier number may be limited to a range within the FFT size.

The $y_k$ means a received signal vector having a size '$N_r \times 1$' in the subcarrier k. The $H_k$ means a channel matrix having a size of '$N_r \times N_t$' in the subcarrier k. The $F^{RF}$ means an RF precoder (i.e., a weight matrix for an analog beamforming) having a size of '$N_t \times N_t$' in a whole subcarrier. And, the RF precoder (analog beamforming) may be identically applicable to the whole subcarrier. The $F_k^{BB}$ means a baseband precoder (i.e., a weight matrix for a digital beamforming) having a size of '$N_{RF} \times N_S$' in the subcarrier k. And, the baseband precoder (digital beamforming) may be individually configured per subcarrier. The $s_k$ indicates a transmitted signal vector having a size of '$N_S \times 1$' in the subcarrier k and the $z_k$ indicates a noise signal vector having a size of '$N_r \times 1$' in the subcarrier k.

The $N_{RF}$ indicates the total number of RF chains, the $N_t$ means the total number of the transmitting stage antennas, and the $N_t^{RF}$ means the number transmitting antennas provided per RF chain. The $N_r$ indicates the total number of the receiving stage antennas and the $N_S$ indicates the number of transmitted data streams.

Each term in Formula 8 is represented in detail as Formula 9.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r 1} & h_{N_r 2} & \cdots & h_{N_r N_t} \end{bmatrix} \qquad \text{[Formula 9]}$$

$$F^{RF} \left( \begin{bmatrix} v_{1,1} & v_{1,2} & \cdots & v_{N_{RF}, N_s} \\ v_{2,1} & v_{2,2} & \cdots & v_{N_{RF}, N_s} \\ \vdots & \vdots & \ddots & \vdots \\ v_{N_{RF},1} & v_{N_{RF},2} & \cdots & v_{N_{RF}, N_s} \end{bmatrix} \begin{bmatrix} x^{(1)} \\ \vdots \\ x^{(N_s-1)} \end{bmatrix} \right) + \begin{bmatrix} z^{(1)} \\ \vdots \\ z^{(N_r)} \end{bmatrix}$$

The '$N_t \times N_{RF}$' precoding matrix $F^{RF}$ of an analog beamforming performed after an RF chain by a phase shifter and a power amplifier can be expressed as Formula 10 in the following.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \qquad \text{[Formula 10]}$$

Moreover, a vector indicating a weight for each of t antennas belonging to an RF chain I in the precoding matrix $F^{RF}$ can be defined as Formula 11 in the following.

$$w^j_{N_t^{RF}} = \begin{bmatrix} w^j_1 \\ w^j_2 \\ \vdots \\ w^j_{N_t^{RF}} \end{bmatrix} \qquad \text{[Formula 11]}$$

Beam Radiation Pattern of Hybrid Beamforming

A hybrid beamforming scheme of the present invention can be performed based on one of antennas of various types including a 1D array, a 2D array, a ring type array and the like. For clarity of the following description, a beam radiation pattern of a hybrid beamforming is described based on ULA (Uniform linear array) antenna. The ULA antenna is exemplarily illustrated, by which the scope of the appended claims and their equivalents is non-limited. In the ULA antenna, a plurality of antenna elements are linearly arrayed in a manner of being spaced apart from each other by an equal space d.

An array response vector of the ULA antenna is expressed as Formula 12 in the following.

$$a(\theta) = \begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \cdots & \exp\left(j2\pi \times (N_t - 1) \times \frac{d}{\lambda}\sin(\theta)\right) \end{bmatrix}^T \qquad \text{[Formula 12]}$$

In Formula 12, the $\lambda$ indicates a wavelength and the d indicates an inter-antenna distance. For clarity, in order to represent an antenna radiation pattern of a hybrid beamformer, the RF chain number $N_{RF}$ is assumed as 4 and the per-RF chain analog antenna number $N_t^{RF}$ is assumed as 4.

Figure 7:
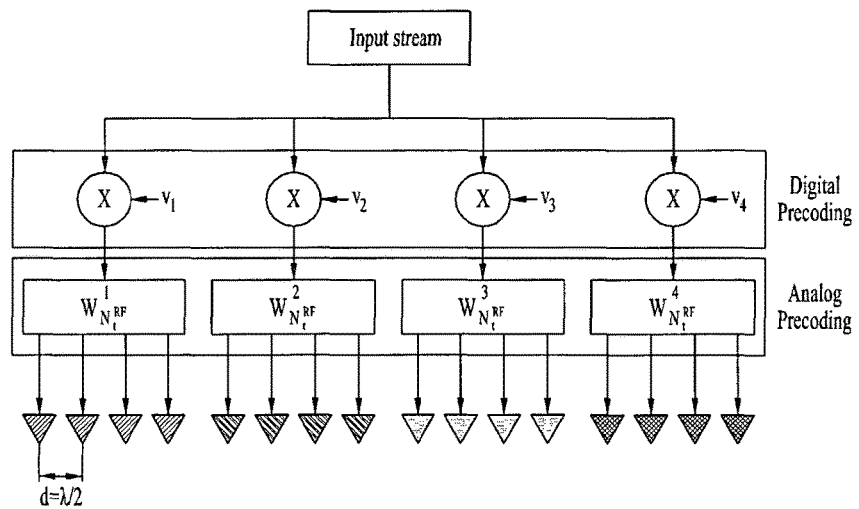
FIG. 7 is a diagram of 16-ULA antenna structure configured with 4 RF chains according to one embodiment of the present invention.

FIG. 7 is a diagram of 16-ULA antenna structure configured with 4 RF chains according to one embodiment of the present invention. Particularly, in FIG. 7, the total transmitting antenna number $N_t$ is 16 and it is d=$\lambda$/2. According to the example shown in FIG. 7, a precoding matrix for an analog beamforming is defined as Formula 13.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \qquad \text{[Formula 13]}$$

$$w^j_{N_t^{RF}} = \begin{bmatrix} w^j_1 \\ w^j_2 \\ w^j_3 \\ w^j_4 \end{bmatrix}$$

In order to form a beam toward a boresight, i.e., a direction of a center of a main lobe of a radio wave radiating from an antenna, a steering angle of the beam is set to 0°. Hence, a value of each of elements of weight vectors of an analog precoding matrix becomes 1. In this case, a random weight vector of a rank 1, which is to be applied to a digital beamforming stage, is defined as Formula 14 in the following. For clarity, a rank 1 is assumed, by which the present invention is non-limited.

$$F^{BB} = v_1 = [v_1 v_2 v_3 v_4]^T \qquad \text{[Formula 14]}$$

A whole antenna array response vector to which the digital beamforming of Formula 14 is applied at a boresight can be represented as Formula 15. In this case, In this case, an inter-antenna distance d is assumed as $\lambda$/2. An antenna array response can be represented as a sum of all vector elements.

$$\sum a(\theta) = \sum_{i=0}^{15} a_i(\theta) = \qquad \text{[Formula 15]}$$

$$(1 \cdot w^1_1 + \exp(j\pi \times \sin(\theta)) \cdot w^2_1 + \exp(j\pi 2 \times \sin(\theta)) \cdot w^3_1 +$$

$$\exp(j\pi 3 \times \sin(\theta)) \cdot w^4_1) \times v_1 +$$

$$(\exp(j\pi 4 \times \sin(\theta)) \cdot w^1_2 + \exp(j\pi 5 \times \sin(\theta)) \cdot w^2_2 +$$

-continued $$\exp(j\pi 6 \times \sin(\theta)) \cdot w^3_2 + \exp(j\pi 7 \times \sin(\theta)) \cdot w^4_2) \times$$

$$v_2 + (\exp(j\pi 8 \times \sin(\theta)) \cdot w^1_3 + \exp(j\pi 9 \times \sin(\theta)) \cdot w^2_3 +$$

$$\exp(j\pi 10 \times \sin(\theta)) \cdot w^3_3 + \exp(j\pi 11 \times \sin(\theta)) \cdot w^4_3) \times$$

$$v_3 + (\exp(j\pi 12 \times \sin(\theta)) \cdot w^1_4 +$$

$$\exp(j\pi 13 \times \sin(\theta)) \cdot w^2_4 + \exp(j\pi 14 \times \sin(\theta)) \cdot w^3_4 +$$

$$\exp(j\pi 15 \times \sin(\theta)) \cdot w^4_4) \times v_4$$

In this case, an analog beamforming weight can be set as Formula 16.

$$w_1^1 = \begin{bmatrix} 1 \\ e^{-j\pi \sin(\phi)} \\ e^{-j\pi 2\sin(\phi)} \\ e^{-j\pi 3\sin(\phi)} \end{bmatrix},$$ [Formula 16]

$$w_2^1 = \begin{bmatrix} e^{-j\pi 4\sin(\phi)} \\ e^{-j\pi 5\sin(\phi)} \\ e^{-j\pi 6\sin(\phi)} \\ e^{-j\pi 7\sin(\phi)} \end{bmatrix} = e^{j\pi 4\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

$$w_3^1 = \begin{bmatrix} e^{-j\pi 8\sin(\phi)} \\ e^{-j\pi 9\sin(\phi)} \\ e^{-j\pi 10\sin(\phi)} \\ e^{-j\pi 11\sin(\varphi)} \end{bmatrix} = e^{j\pi 8\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

$$w_4^1 = \begin{bmatrix} e^{-j\pi 12\sin(\phi)} \\ e^{-j\pi 13\sin(\phi)} \\ e^{-j\pi 14\sin(\phi)} \\ e^{-j\pi 15\sin(\phi)} \end{bmatrix} = e^{j\pi 12\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix}$$

If Formula 15 is simply summarized using Formula 16, Formula 17 can be acquired.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$$ [Formula 16]

If Formula 16 is generalized, it can be represented as Formula 17.

$$\sum a(\theta) = (1 + \exp(j\pi[\sin(\theta) - \sin(\phi)]) + \ldots + \exp(j\pi(N_t^{RF} - 1) \cdot [\sin(\theta) - \sin(\phi)])) \times$$
$$(v_1 + \exp(j\pi \cdot (N_t^{RF}) \cdot [\sin(\theta) - \sin(\phi)]) \cdot v_2 + \ldots + (\exp(j\pi \cdot [N_t^{RF} \cdot (N_{RF} - 1)] \cdot [\sin(\theta) - \sin(\phi)]) \cdot v_{N_{RF}})$$
$$= \left(\sum_{i=1}^{N_t^{RF}} s_i\right) \times \left(\sum_{i=1}^{N_{RF}} t_i\right) = \sum s \times \sum t$$ [Formula 17]

In FIG. 17, $\phi$ means a steering angle of an analog beamforming. For instance, if it is set to $\phi=30°$ or $\pi/6$, a beam gain is maximized at $\theta=30°$ or $\pi/6$. The s shall be named a beam bound vector. And, the t is expressed as Formula 18 and shall be named a beam gain and steering vector or a beam steering vector.

The beam bound vector s indicates a pattern of an analog beam in a hybrid beamforming. The beam steering vector t indicates a gain of a hybrid beam and a pattern of a digital beam in a hybrid beamforming.

The beam bound vector s determines a range and boundary for forming a hybrid beam validly by a hybrid beamforming scheme. Hence, a range of a digital beamforming is limited within a beam bound vector as well as a range of an analog beamforming. For instance, since an analog beam cannot be validly formed over the range of the beam bound vector, it is unable to perform a hybrid beamforming over the range of the beam bound vector. Eventually, since the digital beamforming should be performed within the range of the beam bound vector, it is able to perform the hybrid beamforming.

Figure 8:
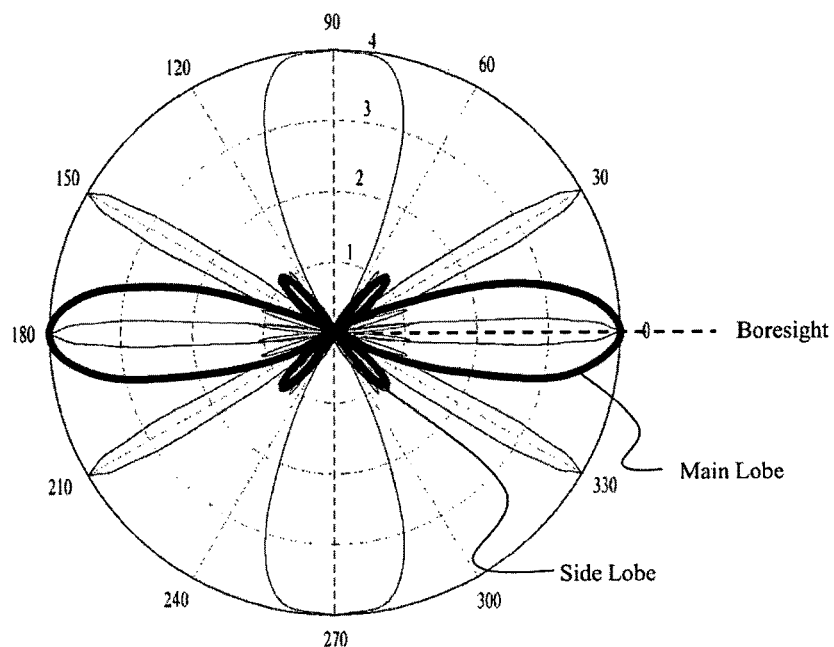
FIG. 8 is a diagram of beam patterns by a beam bound vector and a beam steering vector.

FIG. 8 shows patterns of an analog beam and a digital beam by a beam bound vector and a beam steering vector in a prescribed plane 2-dimensionally. Although an analog beam and a digital beam can be illustrated in 3D pattern, it is apparent to those skilled in the art that they are illustrated in horizontal cross-sections for clarity of the following description. In FIG. 8, $N_t=16$, $N_t^{RF}=4$, $N_{RF}=4$ are assumed. A beam pattern of a beam bund vector is denoted by a thick line, while a beam pattern of a beam steering vector is denoted by a thin line. A boresight of a main lobe of the beam bound vector is 0 degree (or 180 degrees).

A pattern of each beam has a maximum gain at a beam steering angle (i.e., a boresight of a main lobe). As the pattern deviates from the beam steering angle, a beam gain is reduced. The beam gain is represented as a distance from a circle center shown in FIG. 8. A steering angle of a beam is represented as increasing counterclockwise with reference to zero degree.

A beam steering vector can form a beam at 0 degree, 30 degrees, 90 degrees, 150 degrees, 180 degrees, 210 degrees, 270 degrees, or 330 degrees. A hybrid beamforming can be performed in an area where a beam pattern of a beam bound vector and a beam pattern of a beam steering vector cross with each other. For instance, when a steering angle is 0 (or 180), since a gain by a beam bound vector and a gain by a beam steering vector become maximum values, respectively, it is appropriate for a hybrid beamforming to be performed at a point where a steering angle is 0 degree (or 180 degrees). On the other hand, when a steering angle is 30 degrees, since a gain of a beam bound vector is 0, it is unable to perform a hybrid beamforming on the steering angle '30 degrees'.

Figure 9:
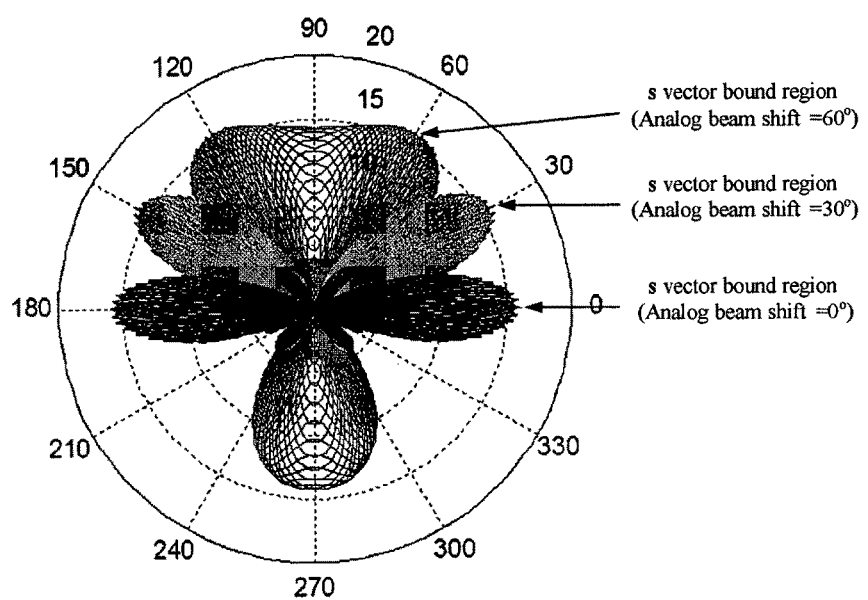
FIG. 9 is a diagram of a beam pattern of a final antenna array response vector in response to an analog beam transition according to one embodiment of the present invention.

FIG. 9 shows an antenna array response when a steering angle of an analog beam is shifted at 0 degree, 30 degrees, or 60 degrees. In FIG. 8, it is assumed that $N_t=16$, $N_t^{RF}=4$, $N_{RF}=4$. And, a result from applying digital $v_1=[v_1 \; v_2 \; v_3 \; v_4]^T$ is shown in FIG. 9. As mentioned in the foregoing descriptions with reference to FIG. 8 and FIG. 9, a range of a valid beam is limited by the vector s.

Digital Beamforming in Consideration of Linear Compensation of Analog Beamforming As mentioned in the foregoing description with reference to Formula 17, a hybrid beam formed by a hybrid beamforming is determined based on the total number $N_{RF}$ of RF chains and the number $N_t^{RF}$ of analog antennas per RF chain. A weight vector of a digital beamforming has a length of '1×$N_{RF}$'.

A direction of a hybrid beam, i.e., a steering angle is determined as a combination of a weight of an analog beam and a weight of a digital beam. If a digital beamforming is performed without pre-compensation for an analog beamforming, an error may be generated from the steering angle of the hybrid beam.

Assuming $N_t=16$, $N_t^{RF}=4$, and $N_{RF}=4$ like Formula 16, a weight '$v=[v_1 \; v_2 \; v_3 \; v_4]^T$' of a digital beam forming can be represented as Formula 18.

$$v = \begin{bmatrix} v_1 \\ v_2 \\ v_3 \\ v_4 \end{bmatrix} = \begin{bmatrix} 1 \\ e^{-j\pi 4\sin(\psi)} \\ e^{-j\pi 8\sin(\psi)} \\ e^{-j\pi 12\sin(\psi)} \end{bmatrix}$$ [Formula 18]

Under a more general condition, a weight of a digital beamforming can be represented as Formula 19.

$$v = \begin{bmatrix} v_1 \\ v_2 \\ \vdots \\ v_{N_{RF}} \end{bmatrix} = \begin{bmatrix} 1 \\ e^{-j\pi \cdot N_t^{RF} \cdot 1 \cdot \sin(\psi)} \\ \vdots \\ e^{-j\pi \cdot N_t^{RF} \cdot (N_{RF}-1) \cdot \sin(\psi)} \end{bmatrix} \quad [\text{Formula 19}]$$

A final array response vector determined in consideration of a steering angle ψ of a digital beamforming can be represented as Formula 20.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (1 + \exp(j\pi 4[\sin(\theta) - \sin(\phi) - \sin(\psi)]) + \exp(j\pi 8[\sin(\theta) - \sin(\phi) - \sin(\psi)]) + \exp(j\pi 12[\sin(\theta) - \sin(\phi) - \sin(\psi)])) \quad [\text{Formula 20}]$$

A part [sin(θ)−sin(ϕ)−sin(ψ)] commonly entering an underlined section in Formula 20 determines an angle of a final hybrid beam. In particular, if sin(ϕ) and sin(ψ) are determined through an analog beamforming and a digital beamforming, respectively, sin(θ) for maximizing a gain of a hybrid beam is finally determined. In this case, a boresight of an analog beam is set to ϕ=3° through the analog beamforming and 'ψ=5°' is set for a fine tuning, Formula 20 can be expressed into Formula 21. For instance, in order to form a hybrid beam at 35°, assume that a beam is moved by 30° and 5° by an analog beamforming and a digital beamforming, respectively.

$$\Sigma a(\theta) = (1 + \exp(j\pi[\sin(\theta) - \sin(30°)]) + \exp(j\pi 2[\sin(\theta) - \sin(30°)]) + \exp(j\pi 3[\sin(\theta) - \sin(30°)])) \times (1 + \exp(j\pi 4[\sin(\theta) - \sin(30°) - \sin(5°)]) + \exp(j\pi 8[\sin(\theta) - \sin(30°) - \sin(5°)]) + \exp(j\pi 12[\sin(\theta) - \sin(30°) - \sin(5°)])) \quad [\text{Formula 21}]$$

Hence, if θ satisfies sin(θ)−sin(30°)−sin(5°)=0, a gain of a hybrid beam is maximized. Yet, the θ satisfying sin(θ)−sin(30°)−sin(5°)=0 is not 35° exactly. If a steering angle of an analog beamforming and a steering angle of a digital beamforming are very small, θ≈ϕ+ψ is met approximately. Yet, if the steering angle of the analog/digital beamforming increases, θ≠ϕ+ψ is not met. Hence, an error is generated between an angle of an intended hybrid beam and an angle of an actually formed hybrid beam and a hybrid beamforming is controlled inaccurately.

Therefore, according to embodiments of the present invention, by performing a pre-compensation on an analog beamforming in performing a digital beamforming, a hybrid beamforming can be controlled accurately.

In particular, for the pre-compensation of the analog beamforming, a weight (or a steering angle) of the digital beamforming can be determined based on Formula 22.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1)(\sin(\phi) - \sin(\phi+\psi))} \end{bmatrix}$$

$$= \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \sin(\phi+\psi)} \end{bmatrix}$$

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \sin(\phi+\psi)} \end{bmatrix} \quad [\text{Formula 22}]$$

⊕: Hadamard product

In Formula 22, a left term of Hadamard product is the component for a pre-compensation of an analog beam and a right term is a finally formed digital beam component. In particular, a digital beam is finally formed at the angle of (ϕ+ψ). Moreover, in case that the digital beam is completely included in the analog beam, an area of the digital beam becomes an area of a hybrid beam in direct. Hence, it may mean that the hybrid beam is finally formed at (ϕ+ψ).

The left term is determined in accordance with a steering angle Φ of the analog beam. The right term is determined in accordance with the angle (ϕ+ψ) at which the digital beam should be finally formed.

Referring to Formula 22, coefficients for determining a weight v of a digital beamforming include a steering angle (Φ) of an analog beam, an angle (ϕ+ψ) for forming a digital beam finally, the number ($N_t^{RF}$) of antennas per RF chain, and the number ($N_{RF}$) of RF chains.

Example of setting a final steering angle of a digital beam is examined as follows. For instance, assume that it is intended to set a final steering angle of a hybrid beam to 35° in an environment of '$N_t$=16, $N_t^{RF}$=4, $N_{RF}$=4' by rotating a hybrid beam at ϕ=30° through an analog beamforming and additionally rotating it at ψ=5°. In this case, a weight of the digital beamforming determined by pre-compensation of the analog beamforming is defined as Formula 23]

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} = \begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix} \quad [\text{Formula 23}]$$

A final antenna response vector obtained by reflecting a weight of a digital beamforming of Formula 22 in Formula 16 is expressed as Formula 24.

$$\sum a(\theta) = (1 + \exp(j\pi[\sin(\theta) - \sin(\phi)]) + \\
\exp(j\pi 2[\sin(\theta) - \sin(\phi)]) + \exp(j\pi 3[\sin(\theta) - (\phi)])) \times \\
(v_1 + \exp(j\pi 4[\sin(\theta) - \sin(\phi)]) \cdot v_2 + \\
\exp(j\pi 8[\sin(\theta) - \sin(\phi)]) \cdot \\
v_3 + \exp(j\pi 12[\sin(\theta) - \sin(\phi)]) \cdot v_4) \\
= (1 + \exp(j\pi[\sin(\theta) - \sin(\phi)]) + \\
\exp(j\pi 2[\sin(\theta) - \sin(\phi)]) + \exp(j\pi 3[\sin(\theta) - \sin(\phi)])) \times \\
\begin{pmatrix} 1 + \exp(j\pi 4[\sin(\theta) - \sin(\phi) + \sin(\phi) - \sin(\phi + \psi)]) + \\ \exp(j\pi 8[\sin(\theta) - \sin(\phi) + \sin(\phi) - \sin(\phi + \psi)]) + \\ \exp(j\pi 12[\sin(\theta) - \sin(\phi) + \sin(\phi) - \sin(\phi + \psi)]) \end{pmatrix} \\
= (1 + \exp(j\pi[\sin(\theta) - \sin(\phi)]) + \\
\exp(j\pi 2[\sin(\theta) - \sin(\phi)]) + \exp(j\pi 3[\sin(\theta) - \sin(\phi)])) \times \\
(1 + \exp(j\pi 4[\sin(\theta) - \sin\phi + (\psi)]) + \\
\exp(j\pi 8[\sin(\theta) - \sin(\phi + \psi)]) + \exp(j\pi 12[\sin(\theta) - \sin(\phi + \psi)]))$$

[Formula 24]

If a final steering angle of a hybrid beamforming is set to 35° by applying φ=30° and ψ=+5° to Formula 24, Formula 24 is expressed as Formula 25.

$$\Sigma a(\theta) = (1+\exp(j\pi[\sin(\theta)-\sin(30°)])+\exp(j\pi 2[\sin(\theta)-\sin(30°)])+\exp(j\pi 3[\sin(\theta)-\sin(30°)])) \times \\
(1+\exp(j\pi 4[\sin(\theta)-\sin(35°)])+\exp(j\pi 8[\sin(\theta)-\sin(35°)])+\exp(j\pi 12[\sin(\theta)-\sin(35°)]))$$

[Formula 25]

Looking into Formula 25, when θ is 35°, a gain of a hybrid beam is maximized as intended.

Figure 10:
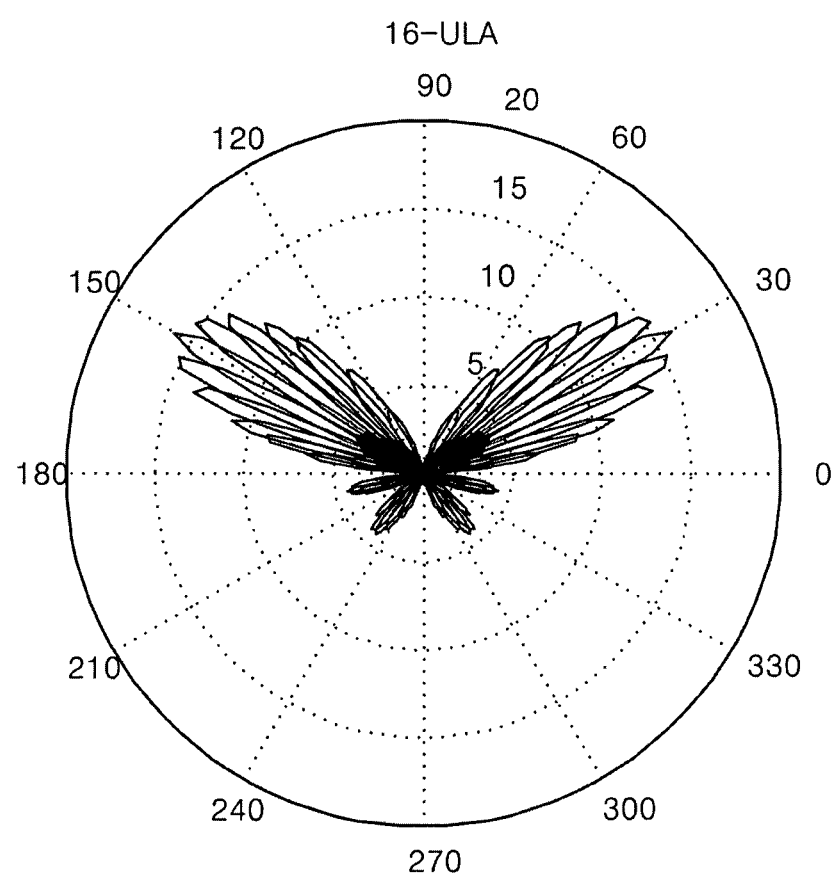
FIG. 10 is a diagram of a final antenna array response vector according to performing a fine-tuning digital beamforming with reference to a fixed analog beamforming angle.

FIG. 10 shows a final antenna array response vector when a digital beamforming is performed at ψ=0, ±5°, ±10°, ±15° with reference to φ=30°. Referring to FIG. 10, it can be observed that a hybrid beam is accurately controlled by 5° unit through a pre-compensation of an analog beamforming.

Figure 11:
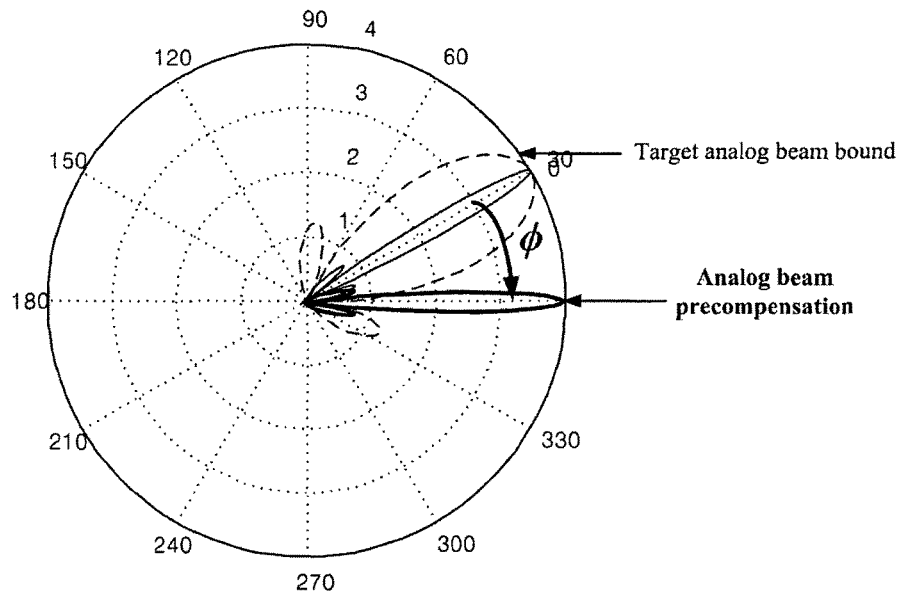
FIG. 11 is a diagram to describe a linear compensation of an analog beamforming to one embodiment of the present invention.

FIG. 11 shows the concept for a pre-compensation of an analog beamforming according to one embodiment of the present invention. Referring to FIG. 11, by eliminating a setup value Φ, i.e., a steering angle, of an analog beamforming through a pre-compensation in a digital beamforming, it is possible to perform an accurate beamforming. Hence, a base station determines a coefficient for a pre-compensation of an analog beam in the digital beamforming using a shifted phase for an analog beam weight. For instance, a left term in Formula 22 is determined in accordance with the setup value Φ of the analog beamforming. A pre-compensation coefficient (cf. the left term in Formula 22) for the analog beam is changed into a zero degree boresight irrespective of an analog beamforming angle.

Figure 12:
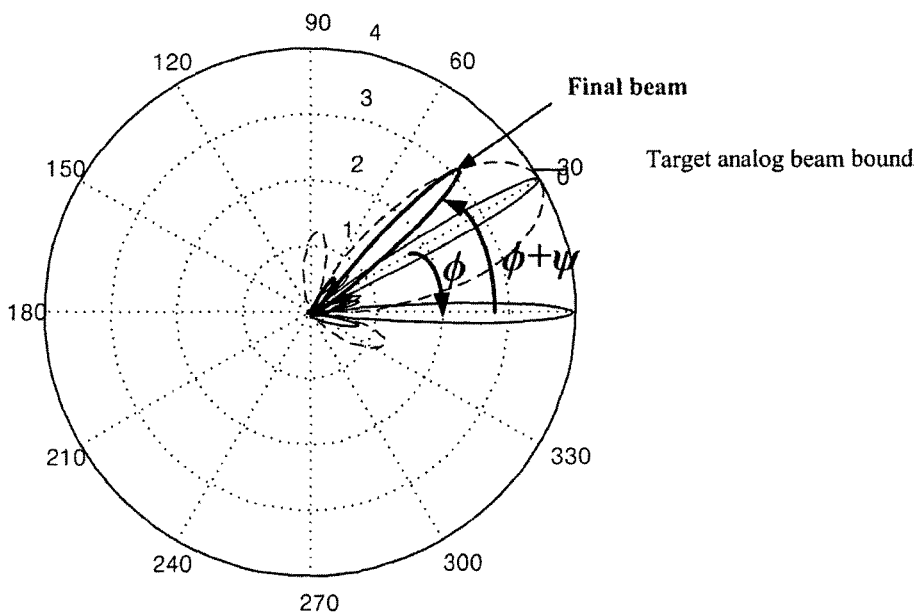
FIG. 12 is a diagram of a final hybrid beam to which a linear compensation of an analog beamforming is applied according to one embodiment of the present invention.

FIG. 12 shows a final hybrid beam to which a pre-compensation of an analog beamforming is applied according to one embodiment of the present invention. Referring to FIG. 12, a digital beam is formed at (φ+ψ). As a digital beam and an analog beam overlap with each other, a hybrid beam is formed. Since the digital beam is located within the analog beam, an area of the digital beam becomes an area of the hybrid beam in direct. Hence, a final hybrid beam is formed in a direction of (φ+ψ).

Thus, another coefficient (cf. the right term of Formula 22) for determining a weight of a digital beamforming is set to a final direction 'φ+ψ' of a beam with reference to 0° irrespective of an analog beamforming setup value Φ. As observed from FIG. 11, analog beam pre-compensation means to adjust a digital beam in 0° direction. In particular, a final direction of a digital beam should be calculated with reference to 0°. Hence, the (φ+ψ) is set not only as a final direction of a digital beam but also as a direction of a hybrid beam.

As mentioned in the foregoing description, a coefficient for determining a weight of a digital beamforming is determined in consideration of association between an analog beam and RF chain. The coefficient for determining the weight of the digital beamforming includes a component for an analog beam pre-compensation and a component for setting a final beam direction. Through the analog beam pre-compensation, it is able to provide a hybrid beam, of which control is facilitated, accurate for a user equipment. A beam is formed depending on the number of analog antennas connected per RF chain and a weight of a digital beamforming is determined in a dual-stage for an accurate final beam control. A beamforming appropriate for a hybrid beamformer can be performed and beam control complexity of a transmitting stage can be lowered.

Codebook of Digital Beamforming

Meanwhile, based on combinations of steering angles of various analog beamformings and angles of various digital beamformings, weights of the digital beamforming in consideration of a pre-compensation of the analog beamforming can be implemented as a codebook. And, the codebook is saved in a base station or a user equipment. Codebooks mentioned in the following description are examples calculated according to the embodiments mentioned in the foregoing description, by which the scope of the appended claims and their equivalents is non-limited.

First Codebook

A first codebook corresponds to a case of performing a fine-tuning digital beamforming on a fixed analog beamforming set and its detailed assumptions are represented as Formula 26.

$d=2/\lambda$ $N_{RF}=4$ $\phi$(Analog $BF$)=0,±30,±60

$\psi$(Digital $BF$)=0,±5,±10,±15  [Formula 26]

For instance, assume that the total antenna number, the RF chain number (i.e., the antenna port number of a digitalprocessing) and the per-RF chain antenna number are set to 16, 4 and 4 in the first codebook, respectively.

Under the assumption of Formula 26, a weight of a digital beamforming by Formula 22 can be expressed as Formula 27.

$$v = \begin{bmatrix} 1 \\ e^{j\pi \cdot 4 \cdot \sin(\phi)} \\ e^{j\pi \cdot 4 \cdot 2 \cdot \sin(\phi)} \\ e^{j\pi \cdot 4 \cdot 3 \cdot \sin(\phi)} \end{bmatrix} \oplus \begin{bmatrix} 1 \\ e^{-j\pi \cdot 4 \cdot \sin(\phi+\psi)} \\ e^{-j\pi \cdot 4 \cdot 2 \cdot \sin(\phi+\psi)} \\ e^{-j\pi \cdot 4 \cdot 3 \cdot \sin(\phi+\psi)} \end{bmatrix}$$ [Formula 27]

If the steering angles of an analog beam, the steering angles of a digital beam, and the steering angles of a hybrid beam assumed in Formula 26 are combined together, it is able to obtain a matrix shown in Formula 28.

$$(\phi, \psi, \phi+\psi) = \begin{Bmatrix} (0,0,0), (0,5,5), (0,-5,-5), (0,10,10), (0,-10,-10), (0,15,15), (0,-15,-15) \\ (30,0,30), (30,5,35), (30,-5,25), (30,10,40), (30,-10,20), (30,15,45), (30,-15,15) \\ \ldots \\ (-60,0,-60), (-60,5,-55), (-60,-5,-65), (-60,10,-50), (-60,-10,-70), (-60,15,-45), (-60,-15,-75) \end{Bmatrix}$$ [Formula 28]

An index is assigned to each element of the matrix shown in Formula 28 in a manner shown in Formula 29.

$$\text{Codebook Index for rank} - 1 = \begin{Bmatrix} 0,1,2,3,4,5,6 \\ 7,8,9,10,11,12,13 \\ \ldots \\ 28,29,30,31,32,33,34 \end{Bmatrix}$$ [Formula 29]

The index shown in Formula 29 can be used as a PMI index in the first codebook for example. A weight of a digital beamforming is mapped to each index shown in Formula 29 in a manner shown in Table 2. A pre-compensation of an analog beamforming is reflected in the first codebook shown in Table 2.

TABLE 2

| Codebook Index (Rank = 1, v = v/√4) | | | | | | |
|---|---|---|---|---|---|---|
| 0 | 1 | 2 | 3 | 4 | 5 | 6 |
| $\begin{bmatrix} 1 \\ 1 \\ 1 \\ 1 \end{bmatrix}$ | $\begin{bmatrix} 1 \\ 0.46 - 0.89i \\ -0.58 - 0.81i \\ -0.99 + 0.14i \end{bmatrix}$ | $\begin{bmatrix} 1 \\ 0.46 + 0.89i \\ -0.58 + 0.81i \\ -0.99 - 0.14i \end{bmatrix}$ | $\begin{bmatrix} 1 \\ -0.57 - 0.82i \\ -0.34 + 0.94i \\ 0.97 - 0.26i \end{bmatrix}$ | $\begin{bmatrix} 1 \\ -0.57 + 0.82i \\ -0.34 - 0.94i \\ 0.97 + 0.26i \end{bmatrix}$ | $\begin{bmatrix} 1 \\ -0.99 + 0.11i \\ 0.98 - 0.22i \\ -0.95 + 0.33i \end{bmatrix}$ | $\begin{bmatrix} 1 \\ -0.99 - 0.11i \\ 0.98 + 0.22i \\ -0.95 - 0.33i \end{bmatrix}$ |
| 7 | 8 | 9 | 10 | 11 | 12 | 13 |
| $\begin{bmatrix} 1 \\ 1 \\ 1 \\ 1 \end{bmatrix}$ | $\begin{bmatrix} 1 \\ 0.60 - 0.80i \\ -0.27 - 0.96i \\ -0.93 - 0.36i \end{bmatrix}$ | $\begin{bmatrix} 1 \\ 0.56 + 0.83i \\ -0.37 + 0.93i \\ -0.97 + 0.22i \end{bmatrix}$ | $\begin{bmatrix} 1 \\ -0.22 - 0.98i \\ -0.90 + 0.43i \\ 0.62 + 0.78i \end{bmatrix}$ | $\begin{bmatrix} 1 \\ -0.40 + 0.92i \\ -0.68 - 0.74i \\ 0.95 - 0.32i \end{bmatrix}$ | $\begin{bmatrix} 1 \\ -0.86 - 0.51i \\ 0.47 + 0.88i \\ 0.05 - 1.00i \end{bmatrix}$ | $\begin{bmatrix} 1 \\ -0.99 + 0.11i \\ 0.98 - 0.22i \\ -0.95 + 0.33i \end{bmatrix}$ |
| 14 | 15 | 16 | 17 | 18 | 19 | 20 |
| $\begin{bmatrix} 1 \\ 1 \\ 1 \\ 1 \end{bmatrix}$ | $\begin{bmatrix} 1 \\ 0.56 - 0.83i \\ -0.37 - 0.93i \\ -0.97 - 0.22i \end{bmatrix}$ | $\begin{bmatrix} 1 \\ 0.60 + 0.80i \\ -0.27 + 0.96i \\ -0.93 + 0.36i \end{bmatrix}$ | $\begin{bmatrix} 1 \\ -0.40 - 0.92i \\ -0.68 + 0.74i \\ 0.95 + 0.32i \end{bmatrix}$ | $\begin{bmatrix} 1 \\ -0.22 + 0.98i \\ -0.90 - 0.43i \\ 0.62 - 0.78i \end{bmatrix}$ | $\begin{bmatrix} 1 \\ -0.99 - 0.11i \\ 0.98 + 0.22i \\ -0.95 - 0.33i \end{bmatrix}$ | $\begin{bmatrix} 1 \\ -0.86 + 0.51i \\ 0.47 - 0.88i \\ 0.05 + 1.00i \end{bmatrix}$ |
| 21 | 22 | 23 | 24 | 25 | 26 | 27 |

TABLE 2-continued

Codebook Index (Rank = 1, v = v/√4)

| | | | | | | |
|---|---|---|---|---|---|---|
| $\begin{bmatrix} 1 \\ 1 \\ 1 \\ 1 \end{bmatrix}$ | $\begin{bmatrix} 1 \\ 0.87 - 0.48i \\ 0.53 - 0.85i \\ 0.05 - 1.00i \end{bmatrix}$ | $\begin{bmatrix} 1 \\ 0.83 + 0.56i \\ 0.38 + 0.92i \\ -0.20 + 0.98i \end{bmatrix}$ | $\begin{bmatrix} 1 \\ 0.60 - 0.80i \\ -0.28 - 0.96i \\ -0.93 - 0.36i \end{bmatrix}$ | $\begin{bmatrix} 1 \\ 0.31 + 0.95i \\ -0.81 + 0.59i \\ -0.81 - 0.59i \end{bmatrix}$ | $\begin{bmatrix} 1 \\ 0.31 - 0.95i \\ -0.81 - 0.59i \\ -0.81 + 0.58i \end{bmatrix}$ | $\begin{bmatrix} 1 \\ -0.41 + 0.91i \\ -0.66 - 0.75i \\ 0.96 - 0.29i \end{bmatrix}$ |

| 28 | 29 | 30 | 31 | 32 | 33 | 34 |
|---|---|---|---|---|---|---|
| $\begin{bmatrix} 1 \\ 1 \\ 1 \\ 1 \end{bmatrix}$ | $\begin{bmatrix} 1 \\ 0.83 - 0.56i \\ 0.38 - 0.92i \\ -0.20 - 0.98i \end{bmatrix}$ | $\begin{bmatrix} 1 \\ 0.87 + 0.48i \\ 0.53 + 0.85i \\ 0.05 + 1.00i \end{bmatrix}$ | $\begin{bmatrix} 1 \\ 0.31 - 0.95i \\ -0.81 - 0.59i \\ -0.81 + 0.59i \end{bmatrix}$ | $\begin{bmatrix} 1 \\ 0.60 + 0.80i \\ -0.28 + 0.96i \\ -0.93 + 0.36i \end{bmatrix}$ | $\begin{bmatrix} 1 \\ -0.41 - 0.91i \\ -0.66 + 0.75i \\ 0.96 + 0.29i \end{bmatrix}$ | $\begin{bmatrix} 1 \\ 0.31 + 0.95i \\ -0.81 + 0.59i \\ -0.81 - 0.58i \end{bmatrix}$ |

Second Codebook

A second codebook corresponds to a case of performing a fine-tuning digital beamforming on a fixed analog beamforming set and its detailed assumptions are represented as Formula 30.

$d = 2/\lambda$ $N_{RF} = 8$ $\phi(\text{Analog } BF) = 0, \pm 30, \pm 60$ $\psi(\text{Digital } BF) = 0, \pm 5, \pm 10, \pm 15$ [Formula 30]

For instance, assume that the total antenna number, the RF chain number (i.e., the antenna port number of a digital processing) and the per-RF chain antenna number are set to 32, 8 and 4 in the second codebook, respectively.

Under the assumption of Formula 30, a weight of a digital beamforming by Formula 22 can be expressed as Formula 31.

$$v = \begin{bmatrix} 1 \\ e^{j\pi \cdot 4 \cdot 1 \cdot \sin(\phi)} \\ e^{j\pi \cdot 4 \cdot 2 \cdot \sin(\phi)} \\ e^{j\pi \cdot 4 \cdot 3 \cdot \sin(\phi)} \\ e^{j\pi \cdot 4 \cdot 4 \cdot \sin(\phi)} \\ e^{j\pi \cdot 4 \cdot 5 \cdot \sin(\phi)} \\ e^{j\pi \cdot 4 \cdot 6 \cdot \sin(\phi)} \\ e^{j\pi \cdot 4 \cdot 7 \cdot \sin(\phi)} \end{bmatrix} \oplus \begin{bmatrix} 1 \\ e^{-j\pi \cdot 4 \cdot 1 \cdot \sin(\phi+\psi)} \\ e^{-j\pi \cdot 4 \cdot 2 \cdot \sin(\phi+\psi)} \\ e^{-j\pi \cdot 4 \cdot 3 \cdot \sin(\phi+\psi)} \\ e^{-j\pi \cdot 4 \cdot 4 \cdot \sin(\phi+\psi)} \\ e^{-j\pi \cdot 4 \cdot 5 \cdot \sin(\phi+\psi)} \\ e^{-j\pi \cdot 4 \cdot 6 \cdot \sin(\phi+\psi)} \\ e^{-j\pi \cdot 4 \cdot 7 \cdot \sin(\phi+\psi)} \end{bmatrix}$$ [Formula 31]

If the steering angles of an analog beam, the steering angles of a digital beam, and the steering angles of a hybrid beam assumed in Formula 31 are combined together, it is able to obtain a matrix shown in Formula 32.

$$(\phi, \psi, \phi+\psi) = \begin{Bmatrix} (0, 0, 0), (0, 5, 5), (0, -5, -5), (0, 10, 10), (0, -10, -10), (0, 15, 15), (0, -15, -15) \\ (30, 0, 30), (30, 5, 35), (30, -5, 25), (30, 10, 40), (30, -10, 20), (30, 15, 45), (30, -15, 15) \\ \ldots \\ (-60, 0, -60), (-60, 5, -55), (-60, -5, -65), (-60, 10, -50), (-60, -10, -70), (-60, 15, -45), (-60, -15, -75) \end{Bmatrix}$$ [Formula 32]

An index is assigned to each element of the matrix shown in Formula 32 in a manner shown in Formula 33.

Codebook Index for rank − 1 = [Formula 33]
$$\begin{Bmatrix} 0, 1, 2, 3, 4, 5, 6 \\ 7, 8, 9, 10, 11, 12, 13 \\ \ldots \\ 28, 29, 30, 31, 32, 33, 34 \end{Bmatrix}$$

The index shown in Formula 33 can be used as a PMI index in the second codebook for example. A weight of a digital beamforming is mapped to each index shown in Formula 33 in a manner shown in Table 3. A pre-compensation of an analog beamforming is reflected in the second codebook shown in Table 3.

TABLE 3

| Codebook Index (Rank = 1, v = v/√8) | | | | | | |
|---|---|---|---|---|---|---|
| 0 | 1 | 2 | 3 | 4 | 5 | 6 |
| $\begin{bmatrix}1\\1\\1\\1\\1\\1\\1\\1\end{bmatrix}$ | $\begin{bmatrix}1\\0.46-0.89i\\-0.58-0.81i\\-0.99+0.14i\\-0.33+0.95i\\0.69+0.72i\\0.96-0.28i\\0.19-0.98i\end{bmatrix}$ | $\begin{bmatrix}1\\0.46+0.89i\\-0.58+0.81i\\-0.99-0.14i\\-0.33-0.95i\\0.69-0.72i\\0.96+0.28i\\0.19+0.98i\end{bmatrix}$ | $\begin{bmatrix}1\\-0.57-0.82i\\-0.34+0.94i\\0.97-0.26i\\-0.77-0.64i\\-0.08+1.00i\\0.86-0.5i\\-0.91-0.42i\end{bmatrix}$ | $\begin{bmatrix}1\\-0.57+0.82i\\-0.34-0.94i\\0.97+0.26i\\-0.77+0.64i\\-0.08-1.00i\\0.86+0.5i\\-0.91+0.42i\end{bmatrix}$ | $\begin{bmatrix}1\\-0.99+0.11i\\0.98-0.22i\\-0.95+0.33i\\0.90-0.43i\\-0.850+0.53i\\0.79-0.62i\\-0.71+0.70i\end{bmatrix}$ | $\begin{bmatrix}1\\-0.99-0.11i\\0.98+0.22i\\-0.95-0.33i\\0.90+0.43i\\-0.850-0.53i\\0.79+0.62i\\-0.71-0.70i\end{bmatrix}$ |
| 7 | 8 | 9 | 10 | 11 | 12 | 13 |
| $\begin{bmatrix}1\\1\\1\\1\\1\\1\\1\\1\end{bmatrix}$ | $\begin{bmatrix}1\\0.60-0.80i\\-0.27-0.96i\\-0.93-0.36i\\-0.85+0.53i\\-0.09+1.00i\\0.74+0.67i\\0.98-0.19i\end{bmatrix}$ | $\begin{bmatrix}1\\0.56+0.83i\\-0.37+0.93i\\-0.97+0.220i\\-0.73-0.68i\\0.15-0.99i\\0.90-0.43i\\0.87+0.50i\end{bmatrix}$ | $\begin{bmatrix}1\\-0.22-0.98i\\-0.90+0.43i\\0.62+0.78i\\0.63-0.780i\\-0.90-0.44i\\-0.23+0.97i\\1.00+0.010i\end{bmatrix}$ | $\begin{bmatrix}1\\-0.40+0.92i\\-0.68-0.74i\\0.95-0.32i\\-0.09+1.00i\\-0.88-0.48i\\0.79-0.61i\\0.24+0.97i\end{bmatrix}$ | $\begin{bmatrix}1\\-0.86-0.51i\\0.47+0.88i\\0.05-1.00i\\-0.55+0.83i\\0.90+0.43i\\-1.00-0.09i\\0.81+0.59i\end{bmatrix}$ | $\begin{bmatrix}1\\-0.99+0.11i\\0.98-0.22i\\-0.95+0.33i\\0.90-0.43i\\-0.85+0.53i\\0.79-0.62i\\-0.71+0.70i\end{bmatrix}$ |
| 14 | 15 | 16 | 17 | 18 | 19 | 20 |
| $\begin{bmatrix}1\\1\\1\\1\\1\\1\\1\\1\end{bmatrix}$ | $\begin{bmatrix}1\\0.56-0.83i\\-0.37-0.93i\\-0.97-0.220i\\-0.73+0.68i\\0.15+0.99i\\0.90+0.43i\\0.87-0.50i\end{bmatrix}$ | $\begin{bmatrix}1\\0.60+0.80i\\-0.27+0.96i\\-0.93+0.36i\\-0.85-0.53i\\-0.09-1.00i\\0.74-0.67i\\0.98+0.19i\end{bmatrix}$ | $\begin{bmatrix}1\\-0.40-0.92i\\-0.68+0.74i\\0.95+0.32i\\-0.09-1.00i\\-0.88+0.48i\\0.79+0.61i\\0.24-0.97i\end{bmatrix}$ | $\begin{bmatrix}1\\-0.22+0.98i\\-0.90-0.43i\\0.62-0.78i\\0.63+0.780i\\-0.90+0.44i\\-0.23-0.97i\\1.00-0.010i\end{bmatrix}$ | $\begin{bmatrix}1\\-0.99-0.11i\\0.98+0.22i\\-0.95-0.33i\\0.90+0.43i\\-0.85-0.53i\\0.79+0.62i\\-0.71-0.70i\end{bmatrix}$ | $\begin{bmatrix}1\\-0.86+0.51i\\0.47-0.88i\\0.05+1.00i\\-0.55-0.83i\\0.90+0.43i\\-1.00+0.09i\\0.81-0.59i\end{bmatrix}$ |
| 21 | 22 | 23 | 24 | 25 | 26 | 27 |
| $\begin{bmatrix}1\\1\\1\\1\\1\\1\\1\\1\end{bmatrix}$ | $\begin{bmatrix}1\\0.87-0.48i\\0.53-0.85i\\0.05-1.00i\\-0.44-0.90i\\-0.82-0.57i\\-0.99-0.100i\\-0.92+0.39i\end{bmatrix}$ | $\begin{bmatrix}1\\0.83+0.56i\\0.38+0.92i\\-0.20+0.98i\\-0.71+0.71i\\-0.98+0.20i\\-0.92-0.38i\\-0.56-0.83i\end{bmatrix}$ | $\begin{bmatrix}1\\0.60-0.80i\\-0.28-0.96i\\-0.93-0.36i\\-0.85+0.53i\\-0.08+1.00i\\0.75+0.67i\\0.98-0.20i\end{bmatrix}$ | $\begin{bmatrix}1\\0.31+0.95i\\-0.81+0.59i\\-0.81-0.59i\\0.31-0.95i\\1\\0.31+0.95i\\-0.81+0.59i\end{bmatrix}$ | $\begin{bmatrix}1\\0.31-0.95i\\-0.81-0.59i\\-0.81+0.59i\\0.30+0.95i\\1\\0.32-0.95i\\-0.80-0.59i\end{bmatrix}$ | $\begin{bmatrix}1\\-0.41+0.91i\\-0.66-0.75i\\0.96-0.29i\\-0.13+0.99i\\-0.85-0.53i\\0.83-0.55i\\0.16+0.99i\end{bmatrix}$ |
| 28 | 29 | 30 | 31 | 32 | 33 | 34 |

TABLE 3-continued

Codebook Index (Rank = 1, v = v/√8)

$$\begin{bmatrix} 1 \\ 1 \\ 1 \\ 1 \\ 1 \\ 1 \\ 1 \\ 1 \end{bmatrix} \begin{bmatrix} 1 \\ 0.83 - 0.56i \\ 0.38 - 0.92i \\ -0.20 - 0.98i \\ -0.71 - 0.71i \\ -0.98 - 0.20i \\ -0.92 + 0.38i \\ -0.56 + 0.83i \end{bmatrix} \begin{bmatrix} 1 \\ 0.87 + 0.48i \\ 0.53 + 0.85i \\ 0.05 + 1.00i \\ -0.44 + 0.90i \\ -0.82 + 0.57i \\ -0.99 + 0.100i \\ -0.92 - 0.39i \end{bmatrix} \begin{bmatrix} 1 \\ 0.31 - 0.95i \\ -0.81 - 0.59i \\ -0.81 + 0.59i \\ 0.31 + 0.95i \\ 1 \\ 0.31 - 0.95i \\ -0.81 - 0.59i \end{bmatrix} \begin{bmatrix} 1 \\ 0.60 + 0.80i \\ -0.28 + 0.96i \\ -0.93 + 0.36i \\ -0.85 - 0.53i \\ -0.08 - 1.00i \\ 0.75 - 0.67i \\ 0.98 + 0.20i \end{bmatrix} \begin{bmatrix} 1 \\ -0.41 - 0.91i \\ -0.66 + 0.75i \\ 0.96 + 0.29i \\ -0.13 - 0.99i \\ -0.85 + 0.53i \\ 0.83 + 0.55i \\ 0.16 - 0.99i \end{bmatrix} \begin{bmatrix} 1 \\ 0.31 + 0.95i \\ -0.81 + 0.59i \\ -0.81 - 0.58i \\ 0.30 - 0.95i \\ 1 \\ 0.32 + 0.95i \\ -0.80 + 0.59i \end{bmatrix}$$

Third Codebook

A third codebook corresponds to a case of performing a fine-tuning digital beamforming on a fixed analog beamforming set and its detailed assumptions are represented as Formula 34.

$d=2/\lambda$ $N_{RF}=8$ $N_t^{RF}=8$

φ(Analog BF)=0,±30,±60

ψ(Digital BF)=0,±5,±10,±15     [Formula 34]

For instance, assume that the total antenna number, the RF chain number (i.e., the antenna port number of a digital processing) and the per-RF chain antenna number are set to 64, 8 and 8 in the third codebook, respectively.

Under the assumption of Formula 34, a weight of a digital beamforming by Formula 22 can be expressed as Formula 35.

$$v = \begin{bmatrix} 1 \\ e^{j\pi \cdot 8 \cdot 1 \cdot sin(\phi)} \\ e^{j\pi \cdot 8 \cdot 2 \cdot sin(\phi)} \\ e^{j\pi \cdot 8 \cdot 3 \cdot sin(\phi)} \\ e^{j\pi \cdot 8 \cdot 4 \cdot sin(\phi)} \\ e^{j\pi \cdot 8 \cdot 5 \cdot sin(\phi)} \\ e^{j\pi \cdot 8 \cdot 6 \cdot sin(\phi)} \\ e^{j\pi \cdot 8 \cdot 7 \cdot sin(\phi)} \end{bmatrix} \oplus \begin{bmatrix} 1 \\ e^{-j\pi \cdot 8 \cdot 1 \cdot sin(\phi+\psi)} \\ e^{-j\pi \cdot 8 \cdot 2 \cdot sin(\phi+\psi)} \\ e^{-j\pi \cdot 8 \cdot 3 \cdot sin(\phi+\psi)} \\ e^{-j\pi \cdot 8 \cdot 4 \cdot sin(\phi+\psi)} \\ e^{-j\pi \cdot 8 \cdot 5 \cdot sin(\phi+\psi)} \\ e^{-j\pi \cdot 8 \cdot 6 \cdot sin(\phi+\psi)} \\ e^{-j\pi \cdot 8 \cdot 7 \cdot sin(\phi+\psi)} \end{bmatrix}$$     [Formula 35]

If the steering angles of an analog beam, the steering angles of a digital beam, and the steering angles of a hybrid beam assumed in Formula 34 are combined together, it is able to obtain a matrix shown in Formula 36.

$(\phi, \psi, \phi+\psi) =$     [Formula 36]

$$\begin{Bmatrix} (0, 0, 0), (0, 5, 5), (0, -5, -5), (0, 10, 10), (0, -10, -10), (0, 15, 15), (0, -15, -15) \\ (30, 0, 30), (30, 5, 35), (30, -5, 25), (30, 10, 40), (30, -10, 20), (30, 15, 45), (30, -15, 15) \\ \ldots \\ (-60, 0, -60), (-60, 5, -55), (-60, -5, -65), (-60, 10, -50), (-60, -10, -70), (-60, 15, -45), (-60, -15, -75) \end{Bmatrix}$$

An index is assigned to each element of the matrix shown in Formula 36 in a manner shown in Formula 37.

Codebook Index for rank − 1 = [Formula 37]

$$\begin{Bmatrix} 0, 1, 2, 3, 4, 5, 6 \\ 7, 8, 9, 10, 11, 12, 13 \\ \ldots \\ 28, 29, 30, 31, 32, 33, 34 \end{Bmatrix}$$

The index shown in Formula 37 can be used as a PMI index in the third codebook for example. A weight of a digital beamforming is mapped to each index shown in Formula 37 in a manner shown in Table 4. A pre-compensation of an analog beamforming is reflected in the third codebook shown in Table 4.

TABLE 4

Codebook Index (Rank = 1, v = v/√8)

| 0 | 1 | 2 | 3 | 4 | 5 | 6 |
|---|---|---|---|---|---|---|
| $\begin{bmatrix}1\\1\\1\\1\\1\\1\\1\\1\end{bmatrix}$ | $\begin{bmatrix}1\\-0.58-0.81i\\-0.33+0.95i\\0.96-0.28i\\-0.79-0.62i\\-0.04+1.00i\\0.84-0.55i\\-0.93-0.37i\end{bmatrix}$ | $\begin{bmatrix}1\\-0.58+0.81i\\-0.33-0.95i\\0.96+0.28i\\-0.79+0.62i\\-0.04-1.00i\\0.84+0.55i\\-0.93+0.37i\end{bmatrix}$ | $\begin{bmatrix}1\\-0.34+0.94i\\-0.77-0.64i\\0.86-0.50i\\0.18+0.98i\\-0.99-0.17i\\0.50-0.87i\\0.65+0.76i\end{bmatrix}$ | $\begin{bmatrix}1\\-0.34-0.94i\\-0.77+0.64i\\0.86+0.50i\\0.18-0.98i\\-0.99+0.17i\\0.50+0.87i\\0.65-0.76i\end{bmatrix}$ | $\begin{bmatrix}1\\0.98-0.22i\\0.90-0.43i\\0.79-0.620i\\0.63-0.77i\\0.45-0.89i\\0.24-0.97i\\0.02-1.00i\end{bmatrix}$ | $\begin{bmatrix}1\\0.98+0.22i\\0.90+0.43i\\0.79+0.620i\\0.63+0.77i\\0.45+0.89i\\0.24+0.97i\\0.02+1.00i\end{bmatrix}$ |

| 7 | 8 | 9 | 10 | 11 | 12 | 13 |
|---|---|---|---|---|---|---|
| $\begin{bmatrix}1\\1\\1\\1\\1\\1\\1\\1\end{bmatrix}$ | $\begin{bmatrix}1\\-0.27-0.96i\\-0.85+0.53i\\0.74+0.67i\\0.44-0.90i\\-0.98-0.18i\\0.10+1.00i\\0.93-0.37i\end{bmatrix}$ | $\begin{bmatrix}1\\-0.37+0.93i\\-0.73-0.68i\\0.90-0.43i\\0.07+1.00i\\-0.96-0.29i\\0.62-0.78i\\0.50+0.87i\end{bmatrix}$ | $\begin{bmatrix}1\\-0.90+0.43i\\0.63-0.78i\\-0.23+0.97i\\-0.22-0.98i\\0.620+0.79i\\-0.90-0.44i\\1.00+0.01i\end{bmatrix}$ | $\begin{bmatrix}1\\-0.68-0.74i\\-0.09+1.00i\\0.79-0.61i\\-0.98-0.17i\\0.54+0.84i\\0.26-0.97i\\-0.89+0.46i\end{bmatrix}$ | $\begin{bmatrix}1\\0.47+0.88i\\-0.55+0.83i\\-1.00-0.09i\\-0.39-0.92i\\0.63-0.78i\\0.98+0.18i\\0.30+0.95i\end{bmatrix}$ | $\begin{bmatrix}1\\0.980-0.22i\\0.90-0.43i\\0.79-0.62i\\0.63-0.77i\\0.45-0.89i\\0.24-0.97i\\0.02-1.00i\end{bmatrix}$ |

| 14 | 15 | 16 | 17 | 18 | 19 | 20 |
|---|---|---|---|---|---|---|
| $\begin{bmatrix}1\\1\\1\\1\\1\\1\\1\\1\end{bmatrix}$ | $\begin{bmatrix}1\\-0.37-0.93i\\-0.73+0.68i\\0.90+0.43i\\0.07-1.00i\\-0.96+0.29i\\0.62+0.78i\\0.50-0.87i\end{bmatrix}$ | $\begin{bmatrix}1\\-0.27+0.96i\\-0.85-0.53i\\0.74-0.67i\\0.44+0.90i\\-0.98+0.18i\\0.10-1.00i\\0.93+0.37i\end{bmatrix}$ | $\begin{bmatrix}1\\-0.68+0.74i\\-0.09-1.00i\\0.79+0.61i\\-0.98+0.17i\\0.54-0.84i\\0.26+0.97i\\-0.89-0.46i\end{bmatrix}$ | $\begin{bmatrix}1\\-0.90-0.43i\\0.63+0.78i\\-0.23-0.97i\\-0.22+0.98i\\0.620-0.79i\\-0.90+0.44i\\1.00-0.01i\end{bmatrix}$ | $\begin{bmatrix}1\\0.980+0.22i\\0.90+0.43i\\0.79+0.62i\\0.63+0.77i\\0.45+0.89i\\0.24+0.97i\\0.02+1.00i\end{bmatrix}$ | $\begin{bmatrix}1\\0.47-0.88i\\-0.55-0.83i\\-1.00+0.09i\\-0.39+0.92i\\0.63+0.78i\\0.98-0.18i\\0.30-0.95i\end{bmatrix}$ |

| 21 | 22 | 23 | 24 | 25 | 26 | 27 |
|---|---|---|---|---|---|---|

TABLE 4-continued

Codebook Index (Rank = 1, v = v/√8)

| 　 | 　 | 　 | 　 | 　 | 　 | 　 |
|---|---|---|---|---|---|---|
| $\begin{bmatrix} 1 \\ 1 \\ 1 \\ 1 \\ 1 \\ 1 \\ 1 \\ 1 \end{bmatrix}$ | $\begin{bmatrix} 1 \\ 0.53 - 0.85i \\ -0.44 - 0.90i \\ -0.99 - 0.10i \\ -0.62 + 0.79i \\ 0.34 + 0.94i \\ 0.98 + 0.21i \\ 0.69 - 0.72i \end{bmatrix}$ | $\begin{bmatrix} 1 \\ 0.38 + 0.92i \\ -0.71 + 0.71i \\ -0.920 - 0.38i \\ -i \\ 0.92 - 0.38i \\ 0.71 + 0.71i \\ -0.38 + 0.92i \end{bmatrix}$ | $\begin{bmatrix} 1 \\ -0.28 - 0.96i \\ -0.85 + 0.53i \\ 0.75 + 0.67i \\ 0.43 - 0.90i \\ -0.99 - 0.17i \\ 0.11 + 0.99i \\ 0.92 - 0.38i \end{bmatrix}$ | $\begin{bmatrix} 1 \\ -0.81 + 0.59i \\ 0.31 - 0.95i \\ 0.31 + 0.95i \\ -0.81 - 0.59i \\ 1 \\ -0.81 + 0.59i \\ 0.31 - 0.95i \end{bmatrix}$ | $\begin{bmatrix} 1 \\ -0.81 - 0.59i \\ 0.30 + 0.95i \\ 0.32 - 0.95i \\ -0.81 + 0.58i \\ 1.00 + 0.01i \\ -0.80 - 0.60i \\ 0.29 + 0.96i \end{bmatrix}$ | $\begin{bmatrix} 1 \\ -0.66 - 0.75i \\ -0.13 + 0.99i \\ 0.83 - 0.55i \\ -0.96 - 0.27i \\ 0.44 + 0.90i \\ 0.39 - 0.92i \\ -0.95 + 0.31i \end{bmatrix}$ |
| 28 | 29 | 30 | 31 | 32 | 33 | 34 |
| $\begin{bmatrix} 1 \\ 1 \\ 1 \\ 1 \\ 1 \\ 1 \\ 1 \\ 1 \end{bmatrix}$ | $\begin{bmatrix} 1 \\ 0.38 - 0.92i \\ -0.71 - 0.71i \\ -0.920 + 0.38i \\ i \\ 0.92 + 0.38i \\ 0.71 - 0.71i \\ -0.38 - 0.92i \end{bmatrix}$ | $\begin{bmatrix} 1 \\ 0.53 + 0.85i \\ -0.44 + 0.90i \\ -0.99 + 0.10i \\ -0.62 - 0.79i \\ 0.34 - 0.94i \\ 0.98 - 0.21i \\ 0.69 + 0.72i \end{bmatrix}$ | $\begin{bmatrix} 1 \\ -0.81 - 0.59i \\ 0.31 + 0.95i \\ 0.31 - 0.95i \\ -0.81 + 0.59i \\ 1 \\ -0.81 - 0.59i \\ 0.31 + 0.95i \end{bmatrix}$ | $\begin{bmatrix} 1 \\ -0.28 + 0.96i \\ -0.85 - 0.53i \\ 0.75 - 0.67i \\ 0.43 + 0.90i \\ -0.99 + 0.17i \\ 0.11 - 0.99i \\ 0.92 + 0.38i \end{bmatrix}$ | $\begin{bmatrix} 1 \\ -0.66 + 0.75i \\ -0.13 - 0.99i \\ 0.83 + 0.55i \\ -0.96 + 0.27i \\ 0.44 - 0.90i \\ 0.39 \ 0.92i \\ -0.95 - 0.31i \end{bmatrix}$ | $\begin{bmatrix} 1 \\ -0.81 + 0.59i \\ 0.30 - 0.95i \\ 0.32 + 0.95i \\ -0.81 - 0.58i \\ 1.00 - 0.01i \\ -0.80 + 0.60i \\ 0.29 - 0.96i \end{bmatrix}$ |

In the first to third codebooks mentioned in the foregoing description, a rank is assumed as 1, an analog beamforming angle is assumed as ±0, 30, or 60 °|ᴴ, and a digital beamforming angle is assumed as ±0, 5, 10, or 15, for clarity of the corresponding description, by which the scope of the appended claims and their equivalents is non-limited. And, it is apparent to those skilled in the art that other codebooks can be obtained on the basis of Formula 22 in accordance with assumptions of more various combinations.

Figure 13:
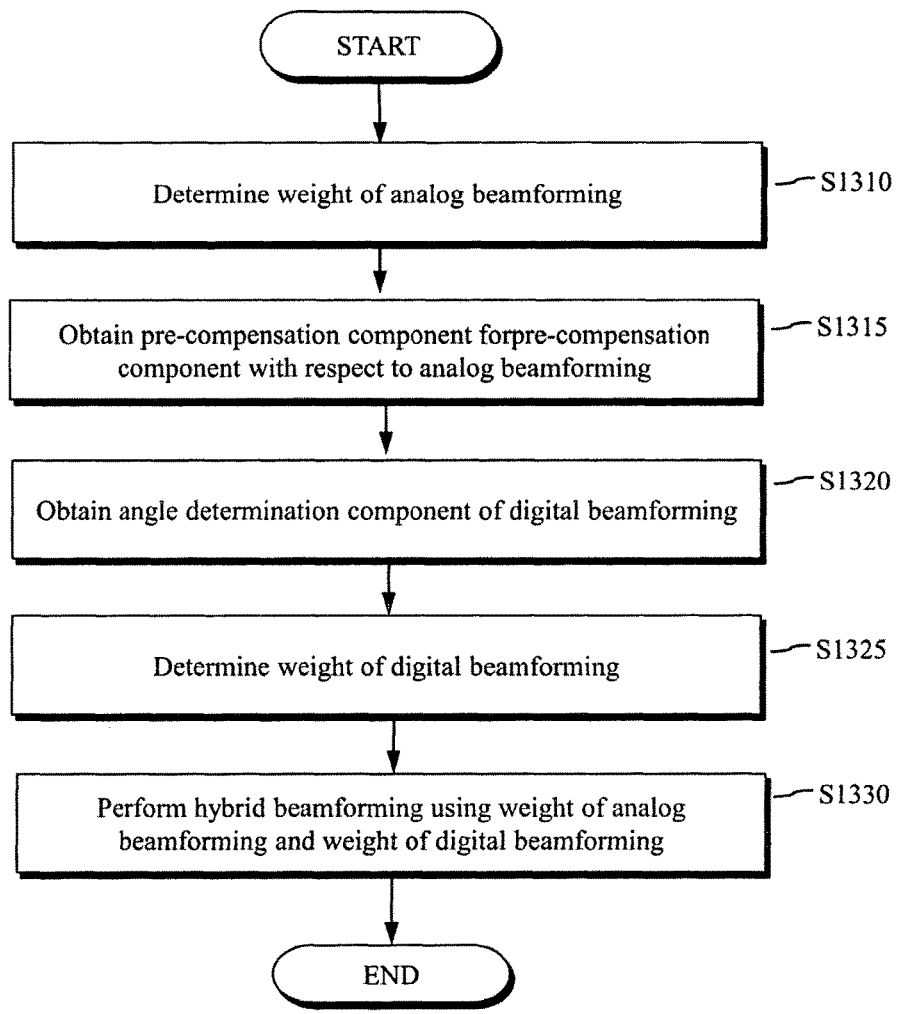
FIG. 13 is a flowchart for a method of determining a weight for a beamforming according to one embodiment of the present invention.

FIG. 13 is a flowchart for a method of determining a weight for a digital beamforming according to one embodiment of the present invention. Details redundant with the foregoing description shall be omitted from the following description.

Referring to FIG. 13, first of all, a base station determines a weight of an analog beamforming [S1310]. The weight of the analog beamforming is determined based on an analog beamforming angle like Formula 16. An angle of the analog beamforming can be determined based on a feedback from a user equipment. For instance, the base station forms bounded beams in multiple directions through the analog beamforming. The base station also forms an omni-directional beam having the same gain in all directions. The user equipment feeds back a gain difference between the bounded beam and the omni-directional beam to the base station. Based on the gain difference, the base station is able to determine a direction, in which the user equipment is located, from the base station. Based on the direction of the user equipment, the base station is able to determine an angle of the analog beamforming and an angle of a hybrid beamforming. The angle of the analog beamforming may be determined as an angle of a bounded beam measured by the user equipment. The angle of the hybrid beamforming may be determined as the user equipment located direction.

Based on the angle of the analog beamforming, the base station obtains a pre-compensation component with respect to the analog beamforming, which will be applied to a digital beamforming. The pre-compensation component with respect to the analog beamforming eliminates a steering of a digital beam according to the analog beamforming from the digital beamforming. Like the left term of Formula 22, the base station obtains the pre-compensation component with respect to the analog beamforming based on the number ($N_{RF}$) of RF chains for performing the analog beamforming, the number ($N_t^{RF}$) of analog antennas included in each RF chain, and the angle ($\Phi$) of the analog beamforming. The pre-compensation component with respect to the analog beamforming is a vector including total $N_t^{RF}$ coefficients and an $i^{th}$ coefficient may include $e^{j\pi \cdot N_t^{RF} \cdot (i-1) \cdot \sin(\Phi)}$.

The base station obtains an angle determination component of the digital beamforming [S1320]. Like the right term of Formula 22, the base station obtains the angle determination component of the digital beamforming using the number ($N_{RF}$) of RF chains for performing the analog beamforming, the number ($N_t^{RF}$) of analog antennas included in each RF chain, and a setup angle ($\beta$) of the digital beamforming. The angle determination component of the digital beamforming is a vector including total $N_t^{RF}$ coefficients and an $i^{th}$ coefficient may correspond to $e^{-j\pi \cdot N_t^{RF} \cdot (i-1) \cdot \sin(\beta)}$.

Using the pre-compensation component with respect to the analog beamforming and the angle determination component of the digital beamforming, the base station determines a weight of the digital beamforming [S1325]. For instance, like Formula 22, the base station performs Hadamard Product of the pre-compensation component with respect to the analog beamforming and the angle determination component of the digital beamforming.

Figure 14:
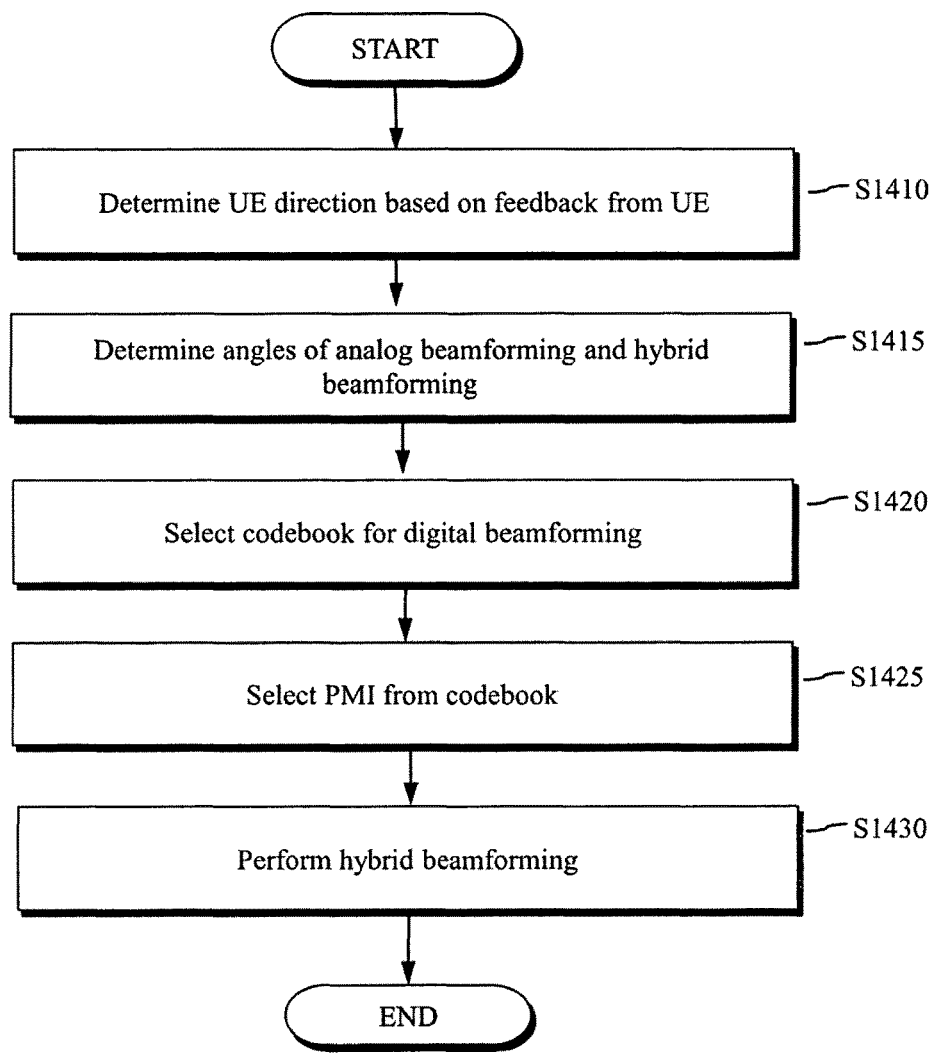
FIG. 14 is a flowchart for a method of determining a weight for a beamforming according to another embodiment of the present invention.

FIG. 14 is a flowchart for a method of determining a weight for a digital beamforming according to another embodiment of the present invention. Details redundant with the foregoing description shall be omitted from the following description.

Referring to FIG. 14, a base station determines a weight of an analog beamforming based on a feedback from a user equipment [S1410]. For instance, the base station forms bounded beams in multiple directions through an analog beamforming. The base station also forms an omni-directional beam having the same gain in all directions. The user equipment feeds back a gain difference between the bounded beam and the omni-directional beam to the base station. Based on the gain difference, the base station is able to determine a direction, in which the user equipment is located, from the base station.

The base station determines an angle of the analog beamforming and an angle of a hybrid beamforming [S1415]. For instance, based on the direction of the user equipment, the base station is able to determine the angle of the analog beamforming and the angle of the hybrid beamforming. For instance, the angle of the analog beamforming may be determined as an angle of a bounded beam measured by the user equipment. The angle of the hybrid beamforming may be determined as the user equipment located direction. Since the analog beamforming has a limited angle adjustment due to resolution, an analog beam having the user equipment located direction as a boresight may not be formed. Instead, a direction of the hybrid beamforming can be made to coincide with the user equipment located direction through a fine tuning of a digital beam.

The base station selects a codebook for the digital beamforming [S1420]. For instance, the base station is able to select the codebook based on at least one of the total number of antennas, the number of antennas per RF chain and the number of RF chains. The codebook may include one of Table 2 to 4 mentioned in the foregoing description, by which the present invention is non-limited. For instance, if the number of RF chains for performing the analog beamforming is 4 and the number of antennas included in each of the RF chains is 4, the codebook may correspond to Table 2.

The base station selects a PMI of the digital beamforming [S1425]. The base station selects PMI from the codebook using the analog beamforming angle and the hybrid beamforming angle.

For instance, like Formula 22, the PMI corresponds to Hadamard Product of a first vector and a second vector, each of which has a size of $N_t^{RF}$. An $i^{th}$ coefficient of the first vector may correspond to $e^{j\pi \cdot N_t^{RF} \cdot (i-1) \cdot sin(\Phi)}$ and an $i^{th}$ coefficient of the second vector may correspond to $e^{-j\pi \cdot N_t^{RF} \cdot (i-1) \cdot sin(\beta)}$. The $N_{RF}$ may indicate the number of RF chains for performing the analog beamforming, the $N_t^{RF}$ may indicate the number of antennas included in each of the RF chains, the $\beta$ may indicate an angle of the hybrid beamforming, and the $\Phi$ may indicate a beamforming angle of a second type.

Based on the weight of the analog beamforming and the PMI of the digital beamforming, the base station performs the hybrid beamforming [S1430]. The weight of the analog beamforming may be determined based on the analog beamforming angle.

Meanwhile, it is not necessary for an applicable scope of the embodiments mentioned in the foregoing description to be limited to a hybrid beamforming. For instance, in a configuration that an analog beamforming stage is replaced by a digital beamforming stage, the present embodiments are applicable. A digital beamforming may be performed sequentially and serially on each antenna subgroup through an antenna subgrouping. Thus, the present embodiments are applicable in a digital beamforming scheme having this hierarchical structure.

For clarity, the foregoing description is made with reference to a downlink, by which the present invention is non-limited. The present embodiments are applicable to various combinations of transmitters and receivers. For instance, the present embodiments are applicable to an uplink transmission scenario for a user equipment-to-base station transmission, an inter-user equipment (e.g., D2D, V2V, etc.) signal transmission scenario, an inter-base station (e.g., relay, wireless backhaul, etc.) signal transmission scenario and the like.

Figure 15:
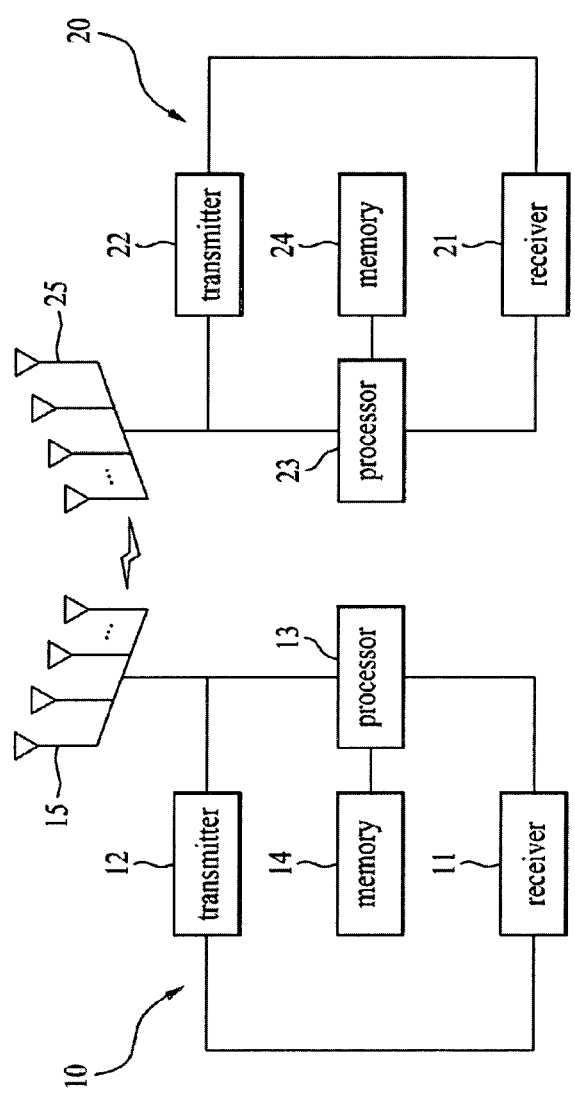
FIG. 15 is a diagram of a base station and a user equipment according to one embodiment of the present invention.

FIG. 15 is a diagram of a configuration of a base station and a user equipment according to one embodiment of the present invention. A base station 10 and a user equipment 20 shown in FIG. 14 can perform the methods mentioned in the foregoing description and redundant details shall be omitted from the following description.

Referring to FIG. 15, a base station 10 may include a receiver 11, a transmitter 12, a processor 13, a memory 14 and a plurality of antennas 15. In this case, a plurality of the antennas 15 may mean a base station supportive of MIMO transmission and reception. The receiver 11 may receive various signals, data and information in uplink from a user equipment. The transmitter 12 may transmit various signals, data and information in downlink to a user equipment. And, the processor 13 may control overall operations of the base station 10.

And, the processor 13 of the base station 10 may perform a function of operating and processing information received by the base station 10, information to be externally transmitted and the like. The memory 14 can store the operated and processed information and the like for a prescribed time and may be substituted with such a component as a buffer (not shown in the drawing) or the like.

According to one embodiment, the processor 13 determines an angle of an analog beamforming in a hybrid beamforming in which the analog beamforming and a digital beamforming are coupled. The processor 13 obtains a pre-compensation component with respect to the analog beamforming, which will be applied to the digital beamforming, based on the angle of the analog beamforming. The processor 13 determines a weight of the digital beamforming using the pre-compensation component with respect to the analog beamforming and an angle determination component of the digital beamforming.

According to another embodiment, in a hybrid beamforming for performing a beamforming of a first type and a second type beamforming hierarchically, the processor 13 determines an angle of the second type beamforming and an angle of the hybrid beamforming. Based on the determined angle of the second type beamforming and the determined angle of the hybrid beamforming, the processor 13 selects a precoding matrix index (PMI) for the first type beamforming. The selected PMI pre-compensates the first type beamforming for a steering by the second type beamforming.

A user equipment 20 may include a receiver 21, a transmitter 22, a processor 23, a memory 24 and a plurality of antennas 25. In this case, a plurality of the antennas 25 may mean a user equipment supportive of MIMO transmission and reception. The receiver 21 may receive various signals, data and information in downlink from a base station. The transmitter 22 may transmit various signals, data and information in uplink to a base station. And, the processor 23 may control overall operations of the user equipment 20.

And, the processor 23 of the user equipment 20 may perform a function of operating and processing information received by the user equipment 20, information to be externally transmitted and the like. The memory 24 can store the operated and processed information and the like for a prescribed time and may be substituted with such a component as a buffer (not shown in the drawing) or the like.

Embodiments of the present invention can be implemented using various means. For instance, embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

The invention claimed is:

1. A method of determining a weight for a beamforming by a base station in a wireless communication system, the method comprising:
   determining an angle of an analog beamforming in a hybrid beamforming in which the analog beamforming and a digital beamforming are coupled;
   obtaining a pre-compensation component with respect to the analog beamforming to be applied to the digital beamforming based on the angle of the analog beamforming;
   performing Hadamard Product of the pre-compensation component with respect to the analog beamforming and an angle determination component of the digital beamforming; and
   determining a weight of the digital beamforming from the Hadamard Product of the pre-compensation component with respect to the analog beamforming and the angle determination component of the digital beamforming.

2. The method of claim 1, wherein the pre-compensation component with respect to the analog beamforming comprises a coefficient for eliminating a digital beam steering to be caused by the analog beamforming from the digital beamforming.

3. The method of claim 1, wherein the obtaining the pre-compensation component with respect to the analog beamforming comprises:
   obtaining the pre-compensation component with respect to the analog beamforming based on a number ($N_{RF}$) of radio frequency (RF) chains performing the analog beamforming, a number ($N_t^{RF}$) of analog antennas included in each of the RF chains, and the angle ($\Phi$) of the analog beamforming.

4. The method of claim 3, wherein the obtaining the pre-compensation component with respect to the analog beamforming further comprises:
   obtaining a vector including total $N_t^{RF}$ coefficients, wherein an $i^{th}$ coefficient of the vector corresponds to $e^{j\pi \cdot N_t^{RF} \cdot (i-1) \cdot sin(\phi)}$.

5. The method of claim 1, further comprising:
   obtaining the angle determination component of the digital beamforming using a number ($N_{RF}$) of radio frequency (RF) chains performing the analog beamforming, a number ($N_t^{RF}$) of analog antennas included in each of the RF chains, and a setup angle ($\beta$) of the digital beamforming.

6. The method of claim 5, wherein the angle determination component of the digital beamforming is a vector including total $N_t^{RF}$ coefficients and wherein an $i^{th}$ coefficient) of the vector corresponds to $e^{-j\pi \cdot N_t^{RF} \cdot (i-1) \cdot sin(\beta)}$.

7. A base station for determining a weight for a beamforming in a wireless communication system, the base station comprising:
   a transmitter for transmitting a downlink signal to a user equipment;
   a receiver for receiving an uplink signal from the user equipment; and
   a processor for controlling the transmitter and the receiver, wherein the processor determines an angle of an analog beamforming in a hybrid beamforming in which the analog beamforming and a digital beamforming are coupled, the processor obtains a pre-compensation component with respect to the analog beamforming to be applied to the digital beamforming based on the angle of the analog beamforming, the processor performs Hadamard Product of the pre-compensation component with respect to the analog beamforming and an angle determination component of the digital beamforming, and the processor determines a weight of the digital beamforming from the Hadamard Product of the pre-compensation component with respect to the analog beamforming and the angle determination component of the digital beamforming.

8. The base station of claim 7, wherein the pre-compensation component with respect to the analog beamforming comprises a coefficient for eliminating a digital beam steering to be caused by the analog beamforming from the digital beamforming.

9. The base station of claim 7, wherein in obtaining the pre-compensation component with respect to the analog beamforming, the processor obtains the pre-compensation component with respect to the analog beamforming based on a number ($N_{RF}$) of radio frequency (RF) chains performing the analog beamforming, a number ($N_t^{RF}$) of analog antennas included in each of the RF chains, and the angle ($\Phi$) of the analog beamforming.

\* \* \* \* \*